(12) United States Patent
Kamemaru

(10) Patent No.: US 6,341,334 B1
(45) Date of Patent: Jan. 22, 2002

(54) BRIDGE METHOD, BUS BRIDGE, AND MULTIPROCESSOR SYSTEM

(75) Inventor: Toshihisa Kamemaru, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/178,493

(22) Filed: Oct. 26, 1998

(30) Foreign Application Priority Data

Mar. 24, 1998 (JP) .................................. 10-075168

(51) Int. Cl.[7] .............................................. G06F 13/16
(52) U.S. Cl. ........................................................ 711/137
(58) Field of Search ................................. 711/213, 218, 711/118, 130, 137; 710/128

(56) References Cited

U.S. PATENT DOCUMENTS

| | | | |
|---|---|---|---|
| 5,721,864 A | 2/1998 | Chiarot et al. | 395/464 |
| 5,802,566 A | 9/1998 | Hagersten | 711/137 |
| 5,809,529 A | 9/1998 | Mayfield | 711/137 |
| 5,915,104 A | * 6/1999 | Miller | 710/129 |
| 6,012,106 A | * 1/2000 | Schumann et al. | 710/22 |
| 6,157,977 A | * 12/2000 | Sherlock et al. | 710/129 |

FOREIGN PATENT DOCUMENTS

| | | |
|---|---|---|
| JP | 56-85168 | 7/1981 |
| JP | 57-123581 | 2/1982 |
| JP | 59-225427 | 12/1984 |
| JP | 62-40554 | 2/1987 |
| JP | 63-284648 | 11/1988 |
| JP | 2-10450 | 1/1990 |
| JP | 2-76048 | 3/1990 |
| JP | 2-133842 | 5/1990 |
| JP | 5-143330 | 6/1993 |
| JP | 6-103169 | 4/1994 |
| JP | 6-510611 | 11/1994 |
| JP | 6-342401 | 12/1994 |
| JP | 7-210460 | 8/1995 |
| JP | 8-314803 | 11/1996 |
| JP | 9-81456 | 3/1997 |
| JP | 9128346 | 5/1997 |
| JP | 9-146835 | 6/1997 |
| JP | 9-160827 | 6/1997 |

\* cited by examiner

*Primary Examiner*—Kevin L. Ellis
(74) *Attorney, Agent, or Firm*—Leydig, Voit & Mayer, Ltd.

(57) ABSTRACT

In a bridge method, bus bridge, and multiprocessor system for predicting request signals to be received, issuance of and data-caching in response to request signals is based on prediction results, and responses are sent to request signals that are actually issued. A request prediction unit predicts the contents of a request signal to be issued from a device connected to a local bus. A cache hit judgment unit determines whether data to be requested is found in a bridge cache. If the data is not found, a request issuer issues a request signal to a device connected to a system bus, such as a memory, before a request signal is actually issued via the local bus. The data obtained as a result is cached in the bridge cache. When the device connected to the local bus actually issues the request signal a response is immediately made, using the data in the bridge cache. Processing delays caused by forcing devices that request data to wait and corresponding reductions in system performance are reduced.

23 Claims, 16 Drawing Sheets

BRIDGE METHOD, BUS BRIDGE, AND MULTIPROCESSOR SYSTEM

BACKGROUND OF THE INVENTION

1. Field of the Invention

This invention relates to a bridge method and a bus bridge for bridging a plurality of buses, and a multiprocessor system utilizing the bridge method and bus bridge.

2. Description of the Related Art

A close-coupled system, which is a system of a plurality of processors connected to a single bus, is a typical example of a multiprocessor system capable of executing in parallel a plurality of processors. However, such a system has a shortcoming in that the number of processors in the system cannot be increased beyond a certain physical upper limit because of constraints on the number that can be connected to a single bus due to the load capacity of bus signal lines. In comparison, a multiprocessor system described in Japanese Laid-Open Patent Publication No. Hei 9-128346 has a configuration in which a plurality of buses are mutually connected with bus bridges, the advantage being that although the number of processors that can be connected to each bus can be limited to within the above-mentioned physical upper limit, the overall system can operate more processors in parallel than the above-mentioned physical upper limit. Namely, the system relating to the above-mentioned publication can include more participating processors, than the close-coupled system.

However, when a device is to receive data from another device in the multiprocessor system described in the above-mentioned publication, the device that is to receive the data may be made to wait temporarily, thus resulting in a delay in processing so as to become an impediment in improving system performance.

An example can be considered where a processor connected to a first bus is to read data from an arbitrary address in a memory connected to a second bus. In response to receiving a data read request from the reading processor via the first bus, a bus bridge connecting the first bus to the second bus transmits a data read request to the second bus. This bus bridge receives data from the memory via the second bus and transmits the data to the first bus. Thus, after the data read request is transmitted to the first bus and until the data is received, the reading processor cannot execute any processing regarding the data. Cache memories usually found at each processor and bus bridge are useful to shorten this idle time, e.g. the use of the bridge cache (called the cache memory for the bus bridge) together with an appropriate bus snoop technique can eliminate the process for requesting data on the memory from the bus bridge via the second bus. However, when executing a program in which the cache hit rate for the bridge cache is low, namely, a program that often requests data not found in the bridge cache, the drop in system performance due to the above-mentioned delay becomes particularly noticeable.

SUMMARY OF THE INVENTION

One object of the present invention is to suppress delays in processing as well as the resulting drop in system performance caused by the idle waiting of a device, such as a processor, that has requested data.

A first aspect of the present invention is a bridge method having a predictive cache process and a response process. In the predictive cache process, on the basis of the contents of a request signal predicted to be issued in the future from a device connected to a first bus, a request signal (an anticipatory request signal) is transmitted onto a second bus to which a device or devices are connected, to request data. Namely, according to a prediction where the device connected to the first bus will issue a signal for requesting data held by any one of the devices connected to the second bus, in the predictive cache process, an anticipatory request signal is issued and transmitted onto the second bus to which the various types of devices including the device or devices holding the requested data are connected, and thus the data is cached, from any one of devices holding the data and connected to the second bus, into a bridge cache.

In the response process, when the data requested by a request signal actually issued from the device connected to the first bus is found in the bridge cache, the data is sent from the bridge cache to the device that issued the request signal.

One case where the data concerning the request signal issued from a device connected to the first bus has already been cached into the bridge cache is a case where the data is already cached into the bridge cache by execution of the predictive cache process. Therefore, according to this aspect, the frequency at which the data can be sent immediately to the device originating the request signal increases and at the same time the frequency at which the device originating the request signal is forced to wait decreases, so that processing delays decrease and system performance improves. Also, since wait instructions are furnished at a lower frequency to the device originating the request signal, the load on the first bus decreases.

A second aspect of the present invention is a bus bridge comprising a bridge cache, a request prediction unit, a cache hit judgment unit, a response generator, and a request issuer. The bridge cache is a cache memory for caching the data held in the devices connected to the first or second bus. The request prediction unit, the cache hit judgment unit, and the request issuer provide functions relating to the predictive cache process in the first aspect. The cache hit judgment unit and the request issuer provide functions relating to the response process in the first aspect.

First, the request prediction unit predicts the contents of the request signal to be issued in the future from a device connected to the first bus and issues a prediction signal indicating the contents of the predicted request signal. When the prediction signal is issued from the request prediction unit, the cache hit judgment unit judges whether or not the data requested by the prediction signal is found in the bridge cache. With regard to the prediction signal issued from the request prediction unit, when it was judged that the data requested by the prediction signal is not found in the bridge cache, the request issuer issues a request signal for requesting the data to the device or devices connected to the second bus. Therefore, if there is a device (or devices) responding to the request signal with the requested data, data predicted to be requested in the future from the device connected to the first bus is cached into the bridge cache in advance of any actual request.

When a request signal is actually issued from the device connected to the first bus, the cache judgment unit judges whether or not the data requested by the request signal is found in the bridge cache. If found, the bus bridge can respond with the data to the device originating the request. Conversely, for the request signal actually issued from the device connected to the first bus, when it is judged the data requested by the request signal is not found in the bridge cache, the response generator on one hand issues a response signal to the device that issued the request signal to instruct the device to wait for a subsequent transmission of that data, while the request issuer on the other hand issues a request signal for requesting that data to the device or devices connected to the second bus. Namely, the device originating the request is made to temporarily wait, during which time the requested data is cached into the bridge cache.

Therefore, with regard to the request signal actually issued from the device connected to the first bus and judged as the requested data is not found in the bridge cache, the frequency at which the device originating the request is forced to temporarily wait is lower than the related art as a result in this aspect. This is realized by the provision of the request prediction unit and the inclusion of the prediction signal, in addition to the request signal that was actually issued for processing, by the cache hit judgment unit and the request issuer. As a result, processing delays caused by a device originating a request being forced to wait and the resulting drop in system performance are less likely to occur. Furthermore, since the frequency for issuing response signals to instruct a device originating a request signal to temporarily wait for a subsequent transmission of the data lowers, the load on the first bus can be reduced.

A third aspect of the present invention is a multiprocessor system comprising a plurality of buses to which a single device or a plurality of devices are connected, and a single bus bridge or a plurality of bus bridges for connecting these buses together. Furthermore, a plurality of processors are connected to the first bus among a plurality of buses, and memory is connected to the second bus, which is connected to the first bus via a bus bridge. The bus bridge according to this aspect utilizes the bus bridge concerning the second aspect of the present invention to bridging access to the memory on the second bus by the processor on the first bus. Therefore, according to this aspect, the advantage concerning the second aspect can be obtained in a system where the memory (such as main memory) is connected to the second bus and the processor (such as a local CPU) is connected to the first bus. Namely, a system can be realized in which a performance drop in the overall system due to processing delays of the processor due to memory accesses is less likely to occur, and in which the load on each bus is relatively low.

In this aspect, for example, a cache block size may be added to the value of an address signal included in the request signal actually issued from a device (such as a processor) connected to the first bus so as to determine a value of the address signal to be included in the prediction signal. This process can be realized simply by providing an adder in the request prediction unit in the second and third aspects. Namely, a relatively simple configuration is sufficient for the request prediction unit.

In embodying the present invention, it is preferable to execute a predictive request inhibiting process for inhibiting the issuance of request signals from the predictive cache process when a predetermined predictive request inhibition condition is satisfied. This enables an adverse effect to be prevented from occurring with the issuance of request signals based on the predicted result. For example, signal transmissions on the second bus, namely, the load on the second bus, can be reduced.

There are several types of predictive request inhibiting processes. A first type is applicable to preventing page boundary overflow, a second type is related to registering predictive access inhibited addresses, a third type is related to inhibiting access to uncacheable spaces, a fourth type prevents data invalidation, and a fifth type uses a result of monitoring the bus load. These types can be selected or combined arbitrarily.

In implementing the first type, a request prediction unit having an adder and a gate is provided in the bus bridge. The adder adds a cache block size to the value of an address signal included in the request signal actually issued from a device (such as a processor) connected to the first bus so as to determine a value of the address signal to be included in the prediction signal. The adder further sets an OVF flag to indicate an overflow if, as a result of adding the cache block size, a carry occurs to a position exceeding the page size. In the preceding case, when the OVF flag has been set, the issuance of the prediction signal is inhibited. Therefore, the issuance of the prediction signal is inhibited in this type when the address signal obtained from the adder and the address signal in the request signal that was actually issued (request signal that is to be the basis of prediction) point to addresses belonging to different pages. As a result, it becomes less likely that the address, having a low probability of being consecutively accessed by a single device, such as a processor, will be used as an address signal in the prediction signal, thus, the load on the second bus is reduced. Further, since it is sufficient simply to use an adder having a function for setting the OVF flag, a prediction signal issue inhibiting process for page boundary overflows can be realized with a relatively simple circuit configuration.

In implementing the second type, a request prediction unit having an adder, an address table, and a gate is provided in the bus bridge. The adder adds the cache block size to the value of the address signal included in the request signal actually issued from a device (such as a processor) connected to the first bus so that the addition determines a value of the address signal to be included in the prediction signal. The address table issues a predictive request disable signal when the value of the address signal obtained from the adder points to a predetermined address. The gate inhibits the issuance of the prediction signal in response to the predictive request disable signal. Therefore, in this type, registering into the address table an address for which inhibition of the issuance of a prediction signal including that address is necessary enables a prediction signal including that address to be issued. This is useful, for example, in preventing a prediction signal from being issued for an address, which may have its contents changed by an access itself.

In implementing the third type, a request prediction unit having an adder, a cacheable/uncacheable discriminator, and a gate is provided in the bus bridge. The adder has the same function as that in the second type. The cacheable/uncacheable discriminator determines whether or not a type signal, included in the request signal actually issued from a device connected to the first bus, includes a flag indicating an access to an uncacheable space. The gate inhibits the issuance of the prediction signal when it is determined the flag is included. This makes it possible to prevent an uncacheable space from being accessed on the basis of the predicted result.

In implementing the fourth type, a request prediction unit having an adder, a type discriminator, and a gate is provided in the bus bridge. The adder has the same function as that of the second type. The type discriminator determines whether or not the type signal included in the request signal actually issued from a device connected to the first bus indicates data read. The gate inhibits the issuance of the prediction signal when it is determined that data read is not indicated. Therefore, it is possible, for example, to prevent an adverse effect of invalidating the data required by a device on the basis of a predicted result, such as when a request signal concerns cache invalidation.

In implementing the fifth type, a request prediction unit having a gate, and a load monitor are provided in the bus bridge. The load monitor monitors the load on the first bus and/or the second bus and sets a high-load flag if a detected load exceeds a predetermined value. The gate inhibits the issuance of the prediction signal when the high-load flag has been set. Therefore, it is possible to prevent the load on the second bus from further increasing due to the request signal issued on the basis of the predicted result, and indirectly the load on the first bus from further increasing.

Furthermore, the load monitor in the fifth type can be realized with an incremental counter, a comparator, and a selector. The incremental counter counts the number of occurrences of effective validity signals included in the request signals on the bus being monitored. The comparator compares the counted result and a criterion. When it is determined as a result of the comparison that the counted result exceeds a predetermined value, the selector thereafter sets a high-load flag within a predetermined period. This makes it possible for the load monitor, which is a means for monitoring the load, to have a relatively simple configuration. Further, the load monitor in the fifth type preferably includes a criterion setting unit for varying the criterion. Providing the criterion setting unit enables the operation of the load monitor to be adjusted according to the performance required of the system.

In embodying the present invention, it is preferable to devise various schemes for improving the prediction accuracy. For example, a request queue, a subtracter, a comparator, and a gate are provided in the request prediction unit. In the request queue are queued request signals actually issued from a device connected to the first bus. The subtracter estimates the request signal that was thought to have been issued in the past by subtracting the cache block size from the address signal in the request signal each time a request signal is issued from a device connected to the first bus. The comparator compares the estimated request signal and the queued request signal. The gate permits the issuance of the prediction signal when the comparison detects a match, and inhibits the issuance when a match is not detected. In this manner, a limitation is imposed on the issuance of request signals onto the second bus on the basis of the transaction history of issued request signals from devices connected to the first bus so that not only does the prediction accuracy increase but the load on the second bus also reduces. Furthermore, if the request queue is provided so as to correspond with each device connected to the first bus and the request queue for queuing is selected on the basis of the source signal included in the request signal, a request signal from a device that does not frequently issue request signals can be prevented from being displaced from the request queue by a request signal from a device that does frequently issue request signals, and prediction can be performed at a relatively high accuracy for any device connected to the first bus. Furthermore, a source discriminator preferably provided in the request prediction unit excludes request signals of a signal type that is not data read from queuing to the request queue, a relatively high prediction accuracy using a relatively shallow queue for the request queue can be realized.

Clearly, from the preceding description, the mode of prediction in the present invention takes the form of a transaction history usage type or a transaction history non-usage type. In a preferred embodiment according to the present invention, the request prediction unit includes a transaction history usage request prediction unit, a transaction history non-usage request prediction unit, and a prediction logic selector. The transaction history usage request prediction unit predicts the contents of a request signal to be issued in the future from a device connected to the first bus on the basis of the contents of a plurality of request signals issued heretofore by the device. On the other hand, the transaction history non-usage request prediction unit predicts the contents of the request signal to be issued in the future by the device connected to the first bus on the basis of the contents of one request signal recently issued by the device. The prediction logic selector selects a predicted result from either the transaction history usage request prediction unit or the transaction history non-usage request prediction unit, and issues a prediction signal based on the selected predicted result. This sort of configuration enhances the flexibility of the system.

The prediction logic selector selects, for example, the predicted result by the transaction history non-usage request prediction unit when the load on the second bus is lower than a first criterion, selects the predicted result by the transaction history usage request prediction unit when the load on the second bus is higher than the first criterion and lower than a second criterion, and inhibits the issuance of the prediction signal when the load on the second bus is higher than the second criterion. This achieves both advantages of limiting the load on the second bus and increasing the prediction accuracy. In another example, the prediction logic selector selects the predicted result through the transaction history non-usage request prediction unit when the load on the first bus is lower than the first criterion, selects the predicted result by the transaction history usage request prediction unit when the load on the first bus is higher than the first criterion and lower than the second criterion, and inhibits the issuance of the prediction signal when the load on the first bus is higher than the second criterion. This achieves both advantages of limiting the load on the first bus and increasing the prediction accuracy. In yet another example, the prediction logic selector is provided with a load monitor for informing the prediction logic selector of the result of comparing the load on the second bus with the first and second criteria and a load monitor for informing the prediction logic selector of the result of comparing the load on the first bus with the first and second criteria. This enables the above-mentioned advantages to be achieved with a relatively simple circuit configuration.

DETAILED DESCRIPTION OF THE PREFERRED EMBODIMENTS

Embodiments of the present invention will be described hereinafter with reference to the accompanying drawings. For simplicity, descriptions of components common among the embodiments will not be repeated.

(1) System Overview

Figure 1:
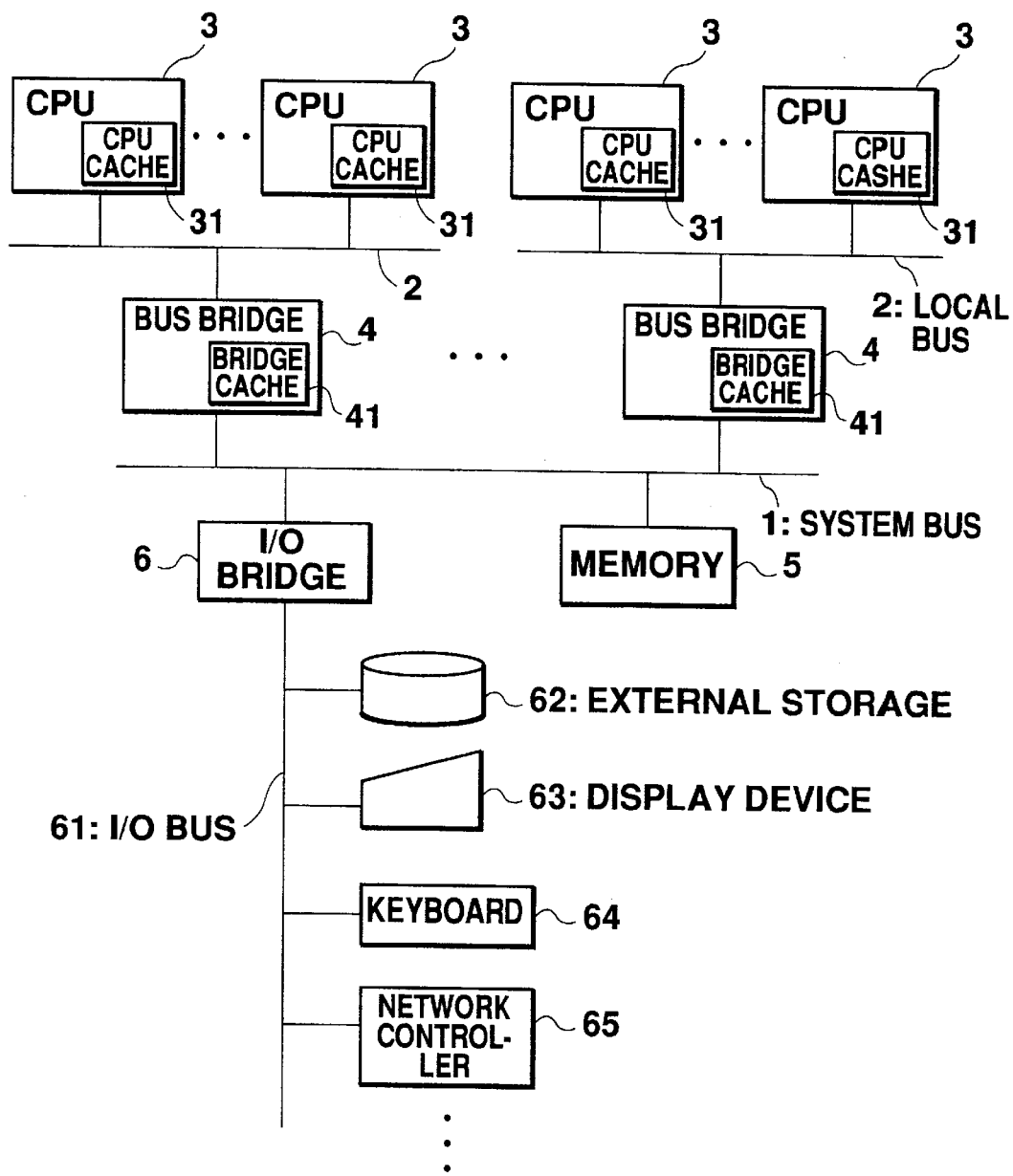
FIG. 1 is a block diagram showing a configuration of a multiprocessor system relating to a first embodiment of the present invention.

FIG. 1 shows a configuration of a multiprocessor system according to a first embodiment of the present invention. Among a plurality of buses shown in this figure, one is a system bus 1 and the rest are local buses 2. To each local bus 2 are connected a plurality of CPUs 3, which are processors, and a bus bridge 4 for connection to the system bus 1. To the system bus 1 are connected a memory 5 and an I/O bridge 6 in addition to the above-mentioned bus bridges 4.

Each bus bridge 4 has a bridge cache 41 as cache memory. Data held in other devices that are connected to the system bus 1, such as memory 5, I/O bridge 6, and other bus bridges 4, is cached in suitable bridge caches 41.

Furthermore, each CPU 3 has a CPU cache 31 for cache memory. Data held in a device connected to the system bus 1 or the other local bus 2 is cached in the CPU cache 31 of the CPU 3 via the bridge cache 41 of the bus bridge 4 that is connected to the same local bus 2. Data in the CPU cache 31 of one CPU 3 can be cached into the CPU cache 31 of another CPU 3 that is connected to the same local bus 2.

The I/O bridge 6 is a bridge connecting an I/O bus 61, to which an external storage 62, a display device 63, a keyboard 64, and network controller 65 are connected, to the system bus 1. Devices not illustrated may also be connected to the I/O bus 61.

(2) Internal Configuration of Bus Bridge

Figure 2:
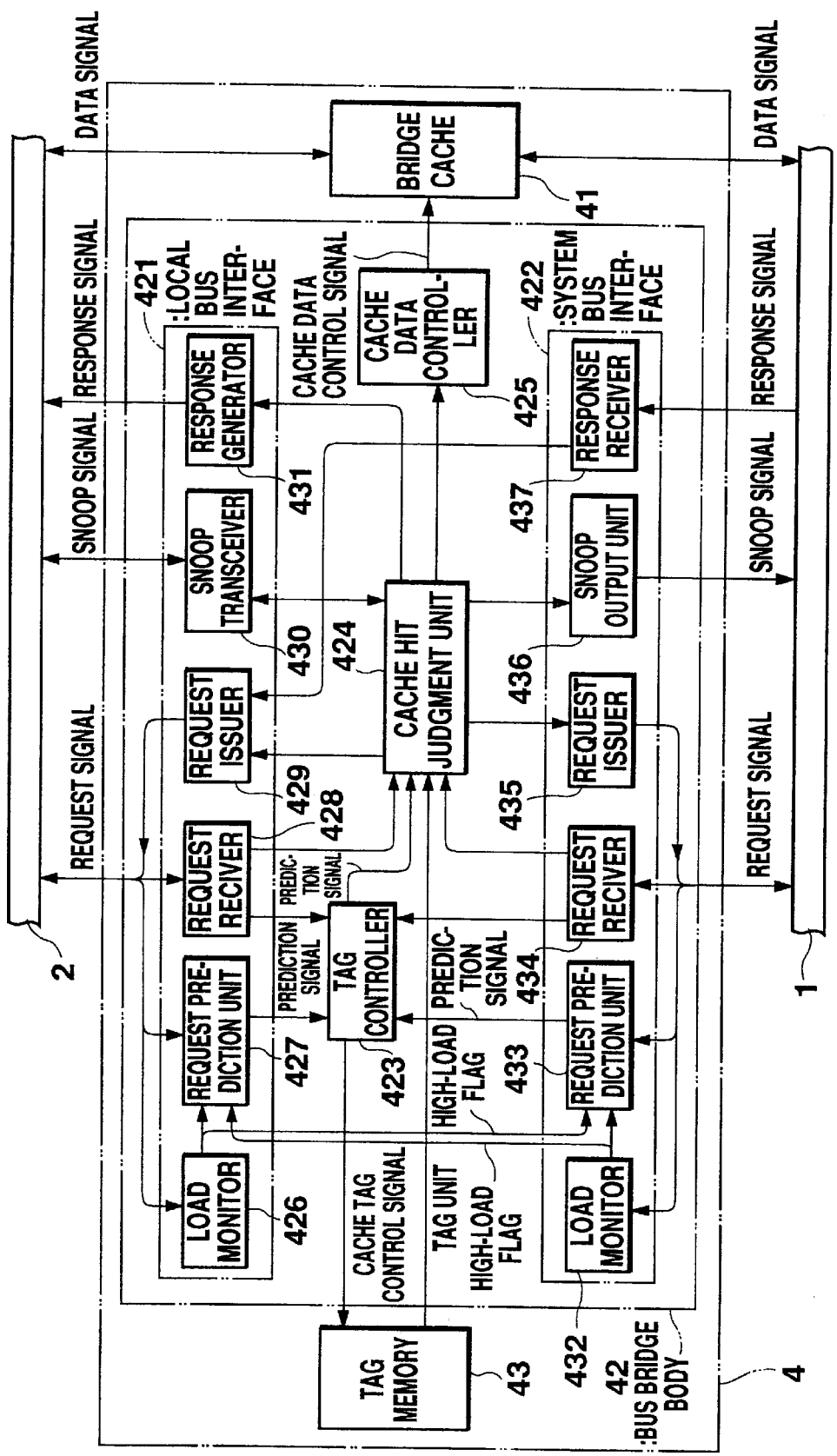
FIG. 2 is a block diagram showing a configuration of a bus bridge in the first embodiment.

As shown in FIG. 2, each bus bridge 4 comprises the bridge cache 41, a bus bridge body 42, and a tag memory 43. The bus bridge body 42 comprises a local bus interface 421, a system bus interface 422, a tag controller 423, a cache hit judgment unit 424, and a cache data controller 425. The local bus interface 421 has a load monitor 426, a request prediction unit 427, a request receiver 428, a request issuer 429, a snoop transceiver 430, and a response generator 431. The system bus interface 422 has a load monitor 432, a request prediction unit 433, a request receiver 434, a request issuer 435, a snoop output unit 436, and a response receiver 437.

Signals transferred over the local bus 2 and the system bus 1 include request signals, snoop signals, response signals, data signals, and the like.

A request signal includes address signals, type signals, source signals, validity signals, and the like. The types of request signals, given by the type signals, include memory read, memory write, memory write back, cache invalidate, I/O read, I/O write, and response. Of course, it is not necessary to prepare all these types of signals in embodying the present invention and other types of requests may be allowed (for example, write through instead of write back may be performed for the memory 5).

The devices for each CPU 3, each bus bridge 4, I/O bridge 6, and so forth are assigned individual and unique numbers. The source signal includes this number, which has been assigned to the device issuing the request signal. The validity signal indicates that the request signal is valid.

The three types of snoop signals used for assertion by the devices are Hit Clean, Hit Modified, and Miss. Furthermore, the types of response signals, which are responses to request signals, include Normal, Defer, and Retry.

The local bus 2 and the system bus 1 both have configurations that allow the mutual transfer of the above-mentioned signals in parallel or series. Furthermore, to each of the above-mentioned signals are usually assigned a plurality of signal lines on the bus.

(3) Basic Operation of the Bus Bridge

Figure 3:
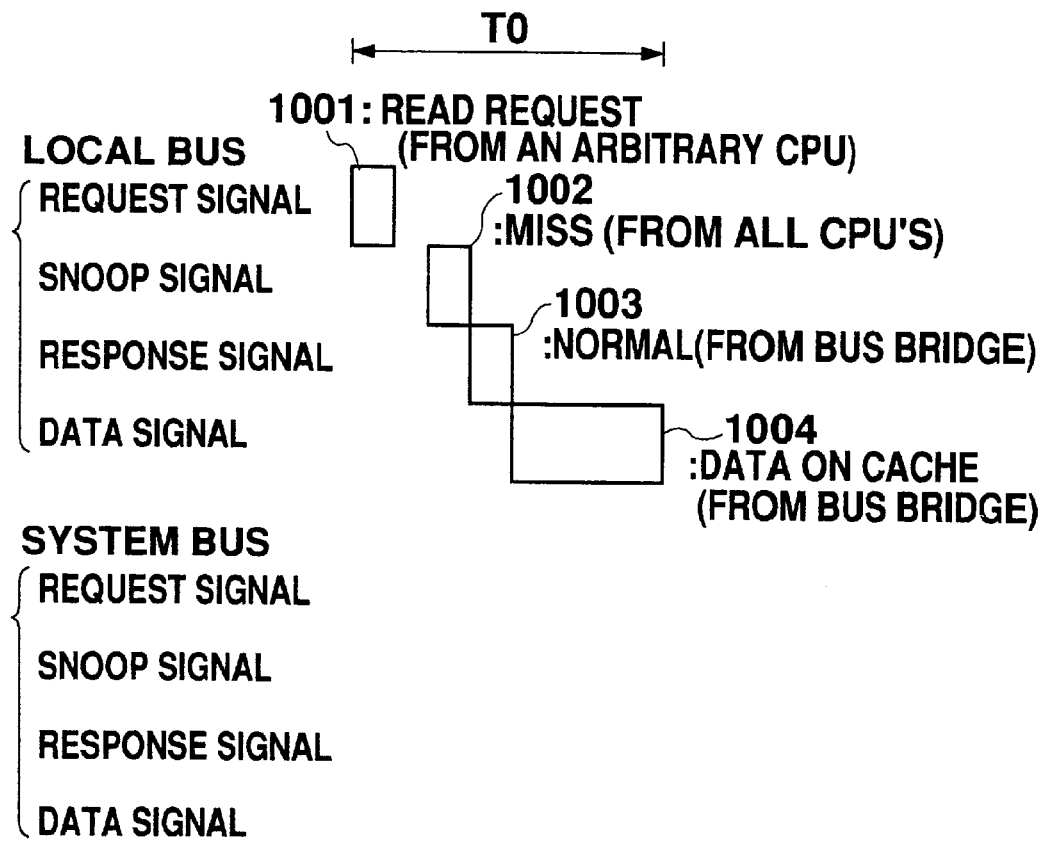
FIG. 3 is a timing chart showing an example of signal transmission states on a local bus and a system bus in the first embodiment.
Figure 4:
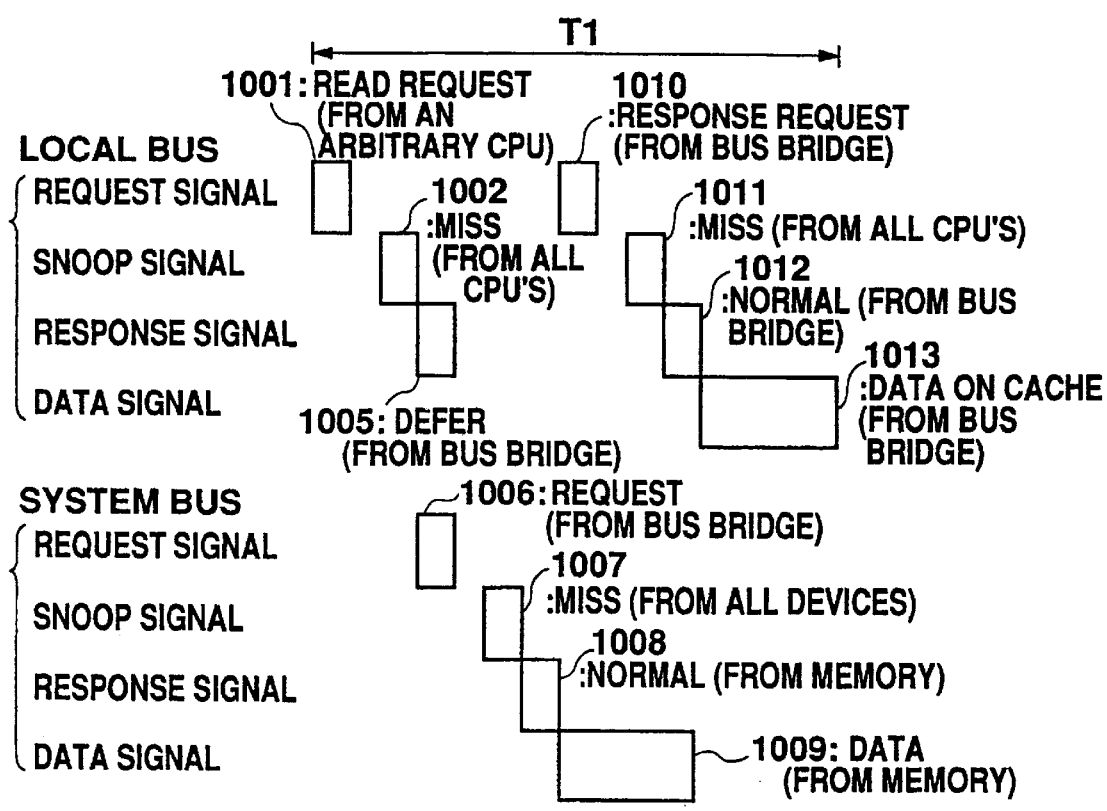
FIG. 4 is a timing chart showing an example of signal transmission states on the local bus and the system bus in the first embodiment.

Using an example where one CPU 3 reads data from a given address in the memory 5, an overview of the flow of signals transferred via the local bus 2 and the system bus 1 is described (refer to FIGS. 3 and 4).

In this example, the CPU 3, which requires the data, first issues a request signal having the contents of address signal=read destination address type signal=memory read source signal=number unique to the CPU 3 originating the request validity signal=on and transmits the request signal onto the local bus 2 to which the CPU3 is connected (1001). The type signal in the request signal indicates the type of request signal, and a "memory read" in this example signifies a data read from the memory 5.

When the request signal that has been transmitted onto the local bus 2 is received, other devices connected to the local bus 2, such as the CPU 3 or bus bridge 4, issue and transmit the snoop signals onto the local bus 2 (1002). The snoop signal specifies the form or status of the data relating to the address signal in the received request signal in the device that issues the snoop signal. For example, if data concerning the requested address is found in the CPU cache 31 of one CPU 3 and is identical to the data in the memory 5, that CPU 3 issues the snoop signal indicating Hit Clean. Furthermore, if the data concerning the requested address is found in the CPU cache 31 of one CPU 3 and is modified data in the memory 5, namely, renewed data, the CPU 3 issues the snoop signal indicating Hit Modified. If the data concerning the requested address is not in the CPU cache 31 of one CPU 3, the CPU 3 issues the snoop signal indicating Miss.

After some sort of assertion is performed from the various devices (plurality of CPUs 3 and bus bridges 4 in FIG. 1) with the snoop signals, one of these devices issues and transmits a response signal onto the local bus 2. Namely, if there is a device that has issued a snoop signal indicating Hit Modified or Hit Clean, that device issues a response signal indicating that the process concerning the request is to be completed normally, namely, a response signal indicating Normal, and transmits the response signal onto the local bus 2. The device that issued the response signal indicating Normal subsequently transmits the corresponding data onto the local bus 2 as a data signal. The CPU 3 that issued the request signal obtains the necessary data by receiving the response signal and data signal.

When all the devices except for the bus bridge 4, i.e. all the CPUs 3 issue snoop signals indicating Miss as shown in FIGS. 3 and 4, the bus bridge 4 connected to that local bus 2 issues a response signal. The contents of the response signal issued by the bus bridge 4 differs depending on whether or not the data concerning the requested address is found in the bridge cache 41 of that bus bridge 4.

First, if the data concerning the requested address is found in the bridge cache 41, namely, the bridge cache 41 hits, as shown in FIG. 3, after the issuance of "Hit Clean" snoop signal and the reception of "Miss" snoop signals, the bus bridge 4 issues a response signal indicating that the process concerning the request is to be completed normally, namely, a response signal indicating Normal, and transmits the response signal (1003) onto the local bus 2 through which the request signal was transmitted. Thereafter, the bus bridge 4 transmits onto the local bus as a data signal (1004) the corresponding data found in the bridge cache 41. The CPU 3 that issued the request signal obtains the necessary data by receiving the response signal and data signal.

Conversely, if the data concerning the requested address is not found in the bridge cache 41, namely, the bridge cache 41 misses, the bus bridge 4 issues a response signal with instructions to wait for a subsequent transmission of data, namely, a response signal indicating Defer, and transmits the response signal (1005) to the local bus 2 through which the request signal was transmitted. At substantially the same time the response signal indicating Defer is transmitted onto the local bus 2, the bus bridge 4 issues a request signal having the contents of address signal=read destination address
type signal=memory read
source signal=number unique to the bus bridge 4 originating the request
validity signal=on and transmits the request signal onto the system bus 1 (1006).

Among the devices connected to the system bus 1, the devices not holding the data concerning the requested address responds to the request signals with a snoop signal indicating Miss, and the device holding the data responds with a snoop signal indicating Hit Modified or Hit Clean (1007). Since the memory 5 is connected to the system bus 1 in the configuration shown in FIG. 1, if there is no other device that asserts Hit Modified or the like, the memory 5 then issues a response signal indicating Normal (1008), and further transmits the data concerning the requested address onto the system bus 1 (1009). The bus bridge 4 caches this data in the corresponding bridge cache 41.

The bus bridge 4 issues, when a response signal indicating Normal is received from the memory 5 via the system bus 1, a request signal having the contents of address signal=address of CPU 3 that requested the data
type signal=response
source signal=number unique to the bus bridge 4 originating the request
validity signal=on and transmits the request signal onto the local bus 2 (1010). Then, snoop signals are issued by all devices, including the bus bridge 4, connected to this local bus 2 (1011). The snoop signals from devices other than the bus bridge 4 originating the request are snoop signals indicating Miss. Furthermore, the response signal from the bus bridge 4 indicating Normal is issued and transmitted onto the local bus 2 (1012). The bus bridge 4 then transmits the data cached from the memory 5, namely, the data concerning the data requested in advance from the CPU 3, to the local bus 2 as a data signal (1013).

As can be understood from the above, in the example of FIG. 4 where the bridge cache 41 misses, a process spanning multiple stages must be executed compared to the example of FIG. 3 where the bridge cache 41 hits. Therefore, when comparing the times from when the CPU 3 issues the request signals to when data is received, time $T_1$ in the example of FIG. 4 is longer than time $T_0$ in the example of FIG. 3. One characteristic of this embodiment is that the bus bridge 4 includes a prediction function regarding the issuance of request signals onto the local bus 2 and an estimated (anticipatory, or preparatory) issue function for request signals onto the system bus 1. Namely, the bus bridge 4 of this embodiment executes the process shown in FIG. 3 or the process shown in FIG. 4, and at the same time executes prediction concerning request signals on the local bus 2, and transmits request signals onto the system bus 1 if required according to the result of the prediction.

Figure 5:
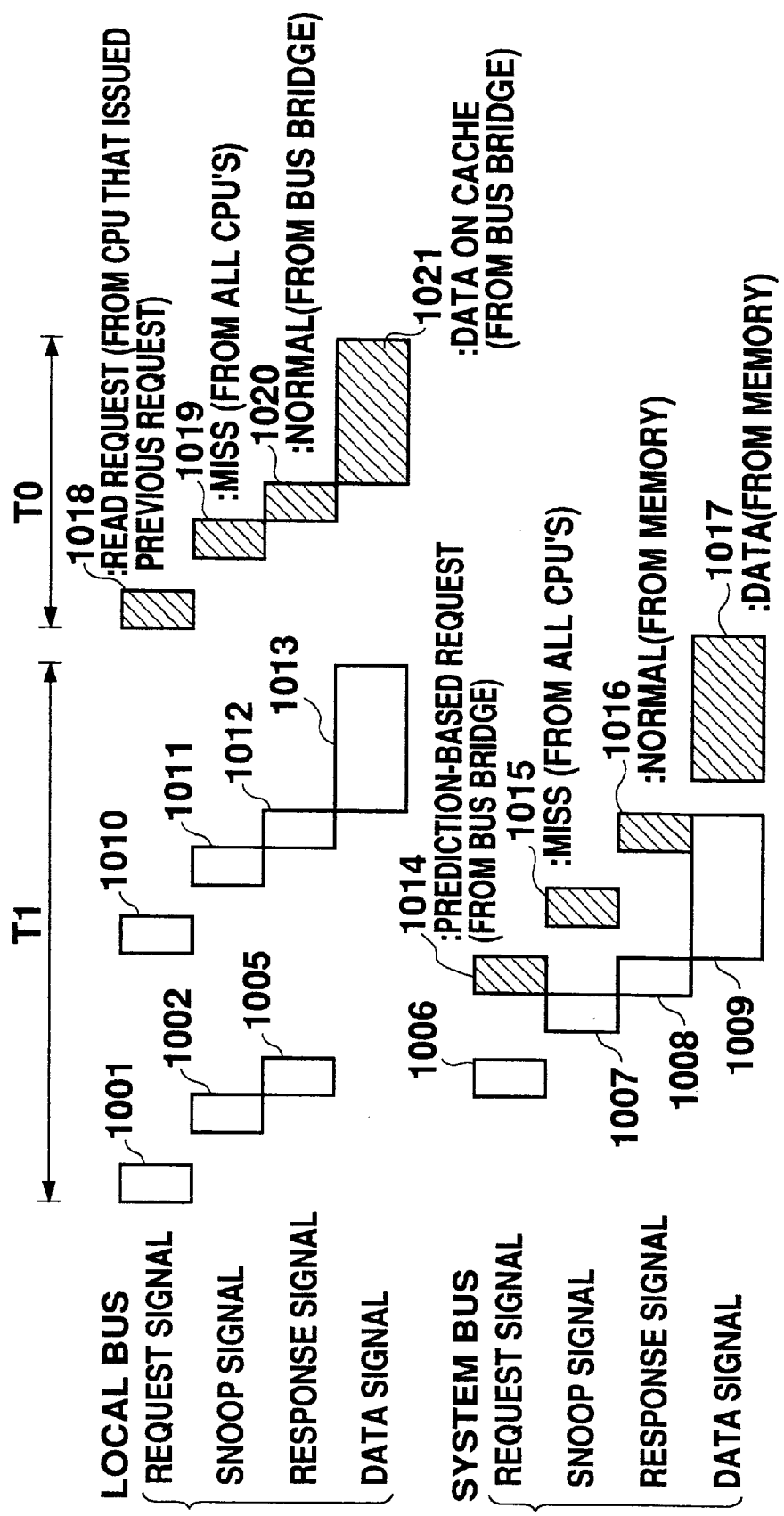
FIG. 5 is a timing chart showing an example of signal transmission states on the local bus and the system bus in the first embodiment.

An example of executing a prediction concerning request signals is shown in FIG. 5. When a request signal (1001) issued by a device connected to the local bus 2, such as the CPU 3, is received, the bus bridge 4 predicts, on the basis of the received request signal, the contents of a request signal the same CPU 3 is to issue in the future. When the issue of a request signal indicating a reading of data from an address in the memory 5 (more commonly, an address of a device not connected to the local bus 2 to which the bus bridge 4 is connected) can be predicted, the bus bridge 4 determines whether or not the data concerning that address is found in the bridge cache 41. Specifically, a determination is made whether or not a response can be made with respect to the request signal using the process shown in FIG. 3 (that is, without Defer), if the request signal predicted to be issued is actually issued in the future. If it is determined that the data is not found in the bridge cache 41, namely, that left as is, it will become necessary to execute the process with Defer shown in FIG. 4 when the request signal predicted to be issued is actually issued in the future, the bus bridge 4 issues and transmits onto the system bus 1 (1014) the request signal on the basis of the predicted result without waiting for the predicted request signal to be actually issued by the CPU 3.

After the bus bridge 4 issues the request signal based on the predicted result, a process is executed to issue snoop signals from the devices connected to the system bus 1 (1015), issue a response signal from one device connected to the system bus 1 (1016), and issue data signals from that device (1017). FIG. 5 shows an example where the signals to be issued in steps 1015 to 1017 and their sources are identical (except for address and data) with the signals to be issued in the above-mentioned steps 1007 to 1009 and their origins.

In some cases, after the data is cached in the bridge cache 41 in this manner, the CPU 3 that issued the request signal in step 1001 issues the request signal as predicted (1018). If in response all devices except for the bus bridge 4 issue snoop signals indicating Miss (1019), the bus bridge 4 issues a response signal indicating Normal (1020) and further issues a data signal concerning the data obtained in step 1017 (1021). The time required to execute steps 1018 to 1021 is equal to the time $T_0$ required to execute steps 1001 to 1004 in FIG. 3, which is shorter than the time $T_1$ required to execute steps 1001 to 1013 in FIG. 4. In other words, for the CPU 3, the rate of the request concerning the memory read resulting in a hit at the bridge cache 41, namely, the cache hit rate at the bridge cache 41, improves substantially. As a result, this embodiment achieves shorter processing delays and therefore improved system performance. Furthermore, since the frequency of transmitting response signals indicating Defer onto the local bus 2 decreases, the load on the local bus 2 is reduced.

With respect to signal transmissions in the system bus 1, steps 1014 to 1017 have been newly added to this embodiment. However, the new addition of steps 1014 to 1017 does not result in a radical increase in load (signal transmission) on the system bus 1. First, when compared to a configuration where the process to cache data from the memory 5 via the system bus 1 to the bridge cache 41 is not executed until after the request signal is actually issued by the CPU 3, the time of execution of the process from transmitting the request signal onto the system bus 1 to receiving the data signal is only advanced. Thus, taking an average over a sufficiently long period of time, the load on the system bus 1 does not increase. Second, as will be described hereinafter, on the basis of the result of monitoring the load on the system bus 1, or on the basis of the address appearing from the predicted result, or according to the type of issued request signal, this embodiment limits the issuance of request signals based on the predicted result so that a momentary increase in the load on the system bus 1 can be prevented.

(4) Operation of Each Bus Bridge Section

The operation of each section of the bus bridge 4 shown in FIG. 2 will be described next.

First, in the local bus interface 421 in FIG. 2, the request receiver 428 includes a function to receive request signals issued from other devices via the local bus 2. The request issuer 429 includes a function to issue and transmit request signals onto the local bus 2. The snoop transceiver 430 includes a function to issue and transmit snoop signals onto the local bus 2 and a function to receive snoop signals issued from other devices via the local bus 2. The response generator 431 includes a function to issue and transmit response signals onto the local bus 2.

In the system bus interface 422, the request receiver 434 includes a function to receive request signals issued by another bus bridge 4 or the like via the system bus 1. The request issuer 435 includes a function to issue and transmit request signals onto the system bus 1. The snoop output unit 436 includes a function to issue and transmit snoop signals onto the system bus 1. The response receiver 437 includes a function to receive response signals issued by the memory 5 or the like via the system bus 1.

Furthermore, the tag controller 423 includes a function to issue a cache tag control signal when the request receiver 428 or 434 receives a request signal or when the request prediction unit 427 or 433 issues a prediction signal. On the basis of a signal read from the tag memory 43 in response to the issuance of the cache tag control signal and the request signal received by the request receiver 428 or 434, or the prediction signal issued by the request prediction unit 427 or 433, the cache hit judgment unit 424 includes a function to determine whether or not data of an address concerning the corresponding request signal is found in the bridge cache 41, namely, whether a hit or a miss occurred. The cache data controller 425 includes a function to issue a cache data control signal, after it is judged that a hit occurred and in addition the response signal was issued, so as to transmit the corresponding data in the bridge cache 41 as a data signal onto the bus to which the device that requested the data is connected. The tag memory 43 mutually assigns and stores information, such as index, tag, and state. The bridge cache 41 receives via the system bus 1 or local bus 2 and stores the data in units of predetermined cache block size.

It is assumed one CPU 3 connected to the local bus 2 issues a request signal to request some data, such as through memory read or I/O read. At this point, as described above, the tag controller 423 issues the cache tag control signal, and the cache hit judgment unit 424 executes a judgment. In more detail, the tag controller 423 issues the cache tag control signal on the basis of an index extracted from the address signal in the received request signal, and the cache hit judgment unit 424 executes a judgment of Hit or Miss on the basis of information read from the tag memory 43, such as tag and state, and the tag extracted from the address signal in the received request signal. Details regarding the judgment of Hit or Miss of the bridge cache 41 are available by referring to the above-mentioned publication. On the basis of this judgment result, the snoop transceiver 430 issues a snoop signal indicating Hit (Hit Clean or Hit Modified) or Miss, and receives snoop signals via the local bus 2 from other devices.

If all other devices issue snoop signals indicating Miss and a judgment of Hit is made in the cache hit judgment unit 424 in one bus bridge 4, the request issuer 429 issues a response signal indicating Normal, after which the cache data controller 425 transmits the corresponding data on the bridge cache 41 as a data signal onto the local bus 2. (Refer to FIG. 3.)

If all other devices issue snoop signals indicating Miss and a judgment of Miss is made in the cache hit judgment unit 424, the request issuer 429 issues a response signal indicating Defer, after which the request issuer 435 issues a request signal, the snoop output unit 436 issues a snoop signal indicating Miss, and the response receiver 437 receives a response signal, such as from the memory 5. When this response signal indicates Normal, the corresponding data is cached into the bridge cache 41 from where the response signal originated, the request issuer 429 issues a request signal indicating a response to the CPU 3 that originated the request, the snoop transceiver 430 issues a snoop signal indicating Hit as well as receives a snoop signal indicating Miss from the other devices, the response signal generator 431 generates a response signal indicating Normal, and the cache data controller 425 transmits the corresponding data in the bridge cache 41 onto the local bus 2. (Refer to FIG. 4.)

In the case where one device connected to the system bus 1 or another local bus 2 issues a request signal to request data, a similar process is performed although snoop signals are received from other devices.

The load monitor 426 and request prediction unit 427 in the local bus interface 421 and the load monitor 432 and request prediction unit 433 in the system bus interface 422 are members related to the issuance of request signals on the basis of the prediction of request signals and the results thereof. First, the request prediction unit 427 predicts the contents of a request signal that is expected to appear in the future on the local bus 2 on the basis of the request signals received via the local bus 2. Similarly, the request prediction unit 433 predicts the contents of a request signal that is expected to appear in the future on the system bus 1 on the basis of the request signals received via the system bus 1.

The tag controller 423 generates a cache tag control signal on the basis of a prediction signal indicating the result of prediction in the request prediction unit 427 or 433, similar to what was performed on the basis of the actually received request signals. The cache hit judgment unit 424 executes a judgment of Hit or Miss regarding the prediction signal. If Miss was judged, a request signal based on the corresponding prediction signal is issued from the request issuer 435 or 429, a snoop signal indicating Miss is issued from the snoop output unit 436 or the snoop transceiver 430, and, in the case where the local bus side device requested data, a response signal from the other devices are received by the response receiver 437. If a response signal indicates Normal, data is cached into the bridge cache 41. Hereafter, in accordance with the predicted request signal issued by the CPU 3 or the like, after the process concerning the transfer of the snoop signal and the response signal, the data in the bridge cache 41 is transmitted onto the local bus 2. (Refer to FIG. 5.)

Furthermore, the load monitor 426 monitors the load on the local bus 2 and, from the result thereof, generates a high-load flag when it appears a relatively large load is on the local bus 2 or when such a condition is expected to occur in the near future. Similarly, the load monitor 432 monitors the load on the system bus 1, and from the result thereof generates a high-load flag when it appears a relatively large load is on the system bus 1 or when such a condition is expected to occur in the near future. The request prediction unit 427 halts the issue of the prediction signal (invalidates the prediction signal) when the load monitor 432 (or 426) generates the high-load flag. The request prediction unit 433 halts the issue of the prediction signal when the load monitor 426 (or 432) generates the high-load flag.

Figure 6:
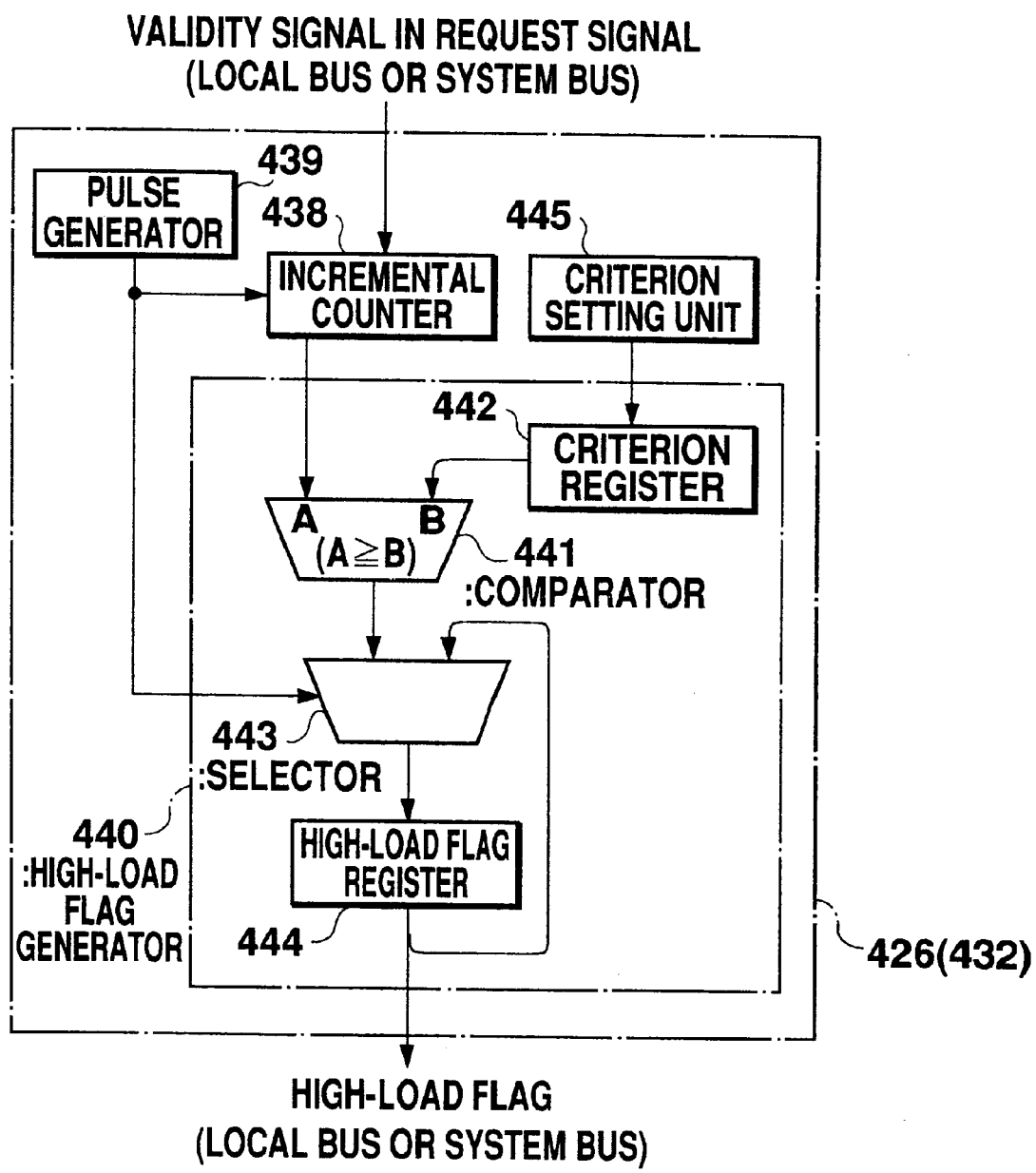
FIG. 6 is a block diagram showing a configuration of a load monitor in the first embodiment.
Figure 7:
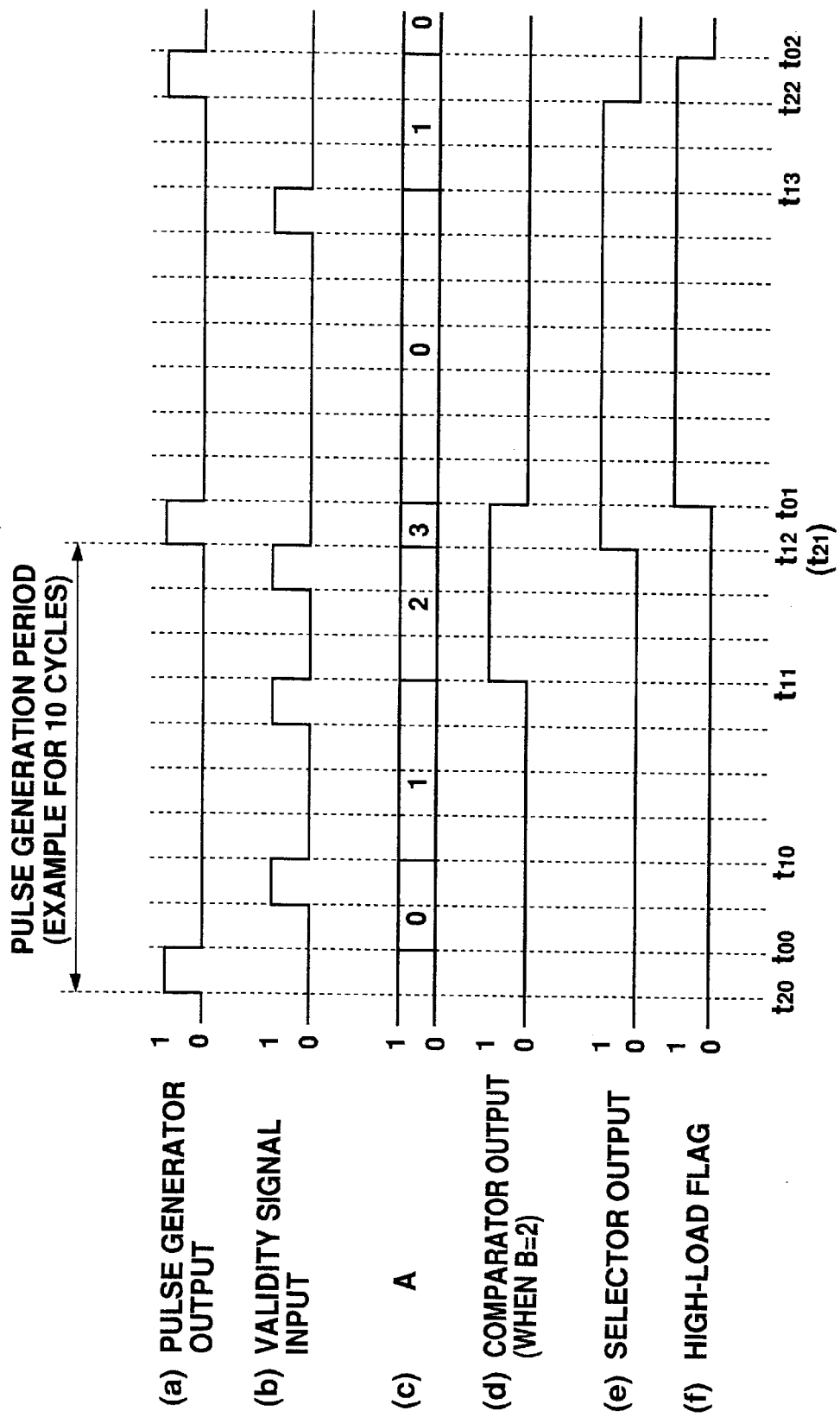
FIG. 7 is a timing chart showing an operation of the load monitor in the first embodiment.

An internal configuration of the load monitor 426 is shown in FIG. 6, and the operation thereof is shown in FIG. 7. The load monitor 426 and the load monitor 432 actually have identical internal configurations and differ from each other only by inputting signals from the local bus 2 or inputting signals from the system bus 1, and by outputting the high-load flag indicating the high-load state of the local bus 2 or outputting the high-load flag indicating the high-load state of the system bus 1. Thus, for simplicity, the description herein of the internal configuration and operation of the load monitor 432 will be omitted. With regard to the internal configuration and operation of the load monitor 432, all instances of "local bus 2" should be read as "system bus 1" and "system bus 1" as "local bus 2" in the description regarding the internal configuration and operation of the load monitor 426.

As shown in FIG. 6, the load monitor 426 includes an incremental counter 438 for counting the number of validity signals in the request signals. The counted value obtained from the incremental counter 438 represents the number of valid request signals (namely, request signals for which validity signals are ON) transmitted onto the local bus 2 from the time the incremental counter 438 was recently reset until the present time. The load monitor 426 includes a pulse generator 439 for generating pulses at a predetermined period, and the incremental counter 438 is reset by the pulses generated by the pulse generator 439. In the example shown in FIG. 7, the pulse generator 439 generates pulses at a period, which repeats 10 reference cycles (refer to FIG. 7(a)), and the incremental counter 438 is reset at the trailing edges, such as $t_{00}$, $t_{01}$, and so forth, of the pulses generated by the pulse generator 439 (FIG. 7(c)).

The load monitor 426 includes a high-load flag generator 440 for generating a high-load flag on the basis of the output of the incremental counter 439. The high-load flag generator 440 includes a comparator 441 having inputs A and B. The comparator 441 outputs a "1" when the relationship A≧B is satisfied, and otherwise outputs a "0". The output of the incremental counter 438 is fed to input A of the comparator 441 and a criterion in a criterion register 442 is fed to input B. Therefore, the output of the comparator 441 is "1" when the number of valid request signals transmitted onto the local bus 2, from the time the incremental counter 438 was recently reset until the present time, exceeds the criterion, namely, when there is a relatively large amount of signal transmissions on the local bus 2.

For example, if the trailing edges of the valid request signals are $t_{10}$, $t_{11}$, etc. (refer to FIG. 7(b)), and the criterion is "2", the counted value by the incremental counter 438 after being reset at $t_{00}$ is at least 2 between the trailing edge $t_{11}$ of the second valid request signal and the trailing edge $t_{01}$ of the next pulse. Therefore, the output of the comparator 441 is "1" for the period from $t_{11}$ to $t_{01}$.

The high-load flag generator 440 includes a selector 443, which is controlled by pulses generated by the pulse generator 439, and a high-load flag register 444 for holding the output of the selector 443. The selector 443 selects the output of the comparator 441 while the pulse from the output of the pulse generator 439 is "1" and selects the signal held by the high-load flag register 444 while the pulse is "0". The selected signal is written to the high-load flag register 444.

In the example shown in FIG. 7, the output of the comparator 41 (refer to FIG. 7(d)) is selected by the selector 443 and written to the high-load flag register 444 at the leading edges $t_{20}$, $t_{21}$, and so forth, of the pulses generated by the pulse generator 439 (refer to FIG. 7(e)). Then, the signal in the high-load flag register 444 (refer to FIG. 7(f)) is selected by the selector 443 at the trailing edges $t_{00}$, $t_{01}$, and so forth (refer to FIG. 7(e)). Since the number of valid request signals generated during an interval from the leading edge $t_{20}$ of the first pulse until the leading edge $t_{21}$ of the second pulse exceeds the criterion in the comparator 441 in this example, a "1" is held in the high-load register 444 during an interval from the trailing edge $t_{01}$ of the second pulse until the trailing edge $t_{02}$ of the third pulse.

In this manner, when the number of generated valid request signals in the last pulse repetition period exceeds the criterion, a "1" is written to the high-load flag register 444, and the content of the high-load flag register 444 is held at least until the trailing edge of the next pulse. In this embodiment, the signal held by the high-load flag register 444 is output as a high-load flag. Namely, if "1" is held in the high-load flag register 444, the high-load flag=ON, and if "0" is held, the high-load flag=OFF. The high-load flag in this embodiment is thus a flag indicating that the load of the local bus 2 is large in the single last pulse repetition period.

The load monitor 426 includes a criterion setting unit 445 as a means for setting the criterion into the criterion register 442. The criterion setting unit 445 sets the criterion into the criterion register 442 through software or hardware according to command from a user or external device. The criterion is a reference value for determining whether or not to set to "1" the output of the comparator 441. Since the criterion can be set by a user or external device in this manner, the criterion can be arbitrarily changed in this embodiment, for example, in accordance with the performance required of the system so that the extent of restrictions imposed on the issuance of request signals on the basis of the predicted result can be changed.

Figure 8:
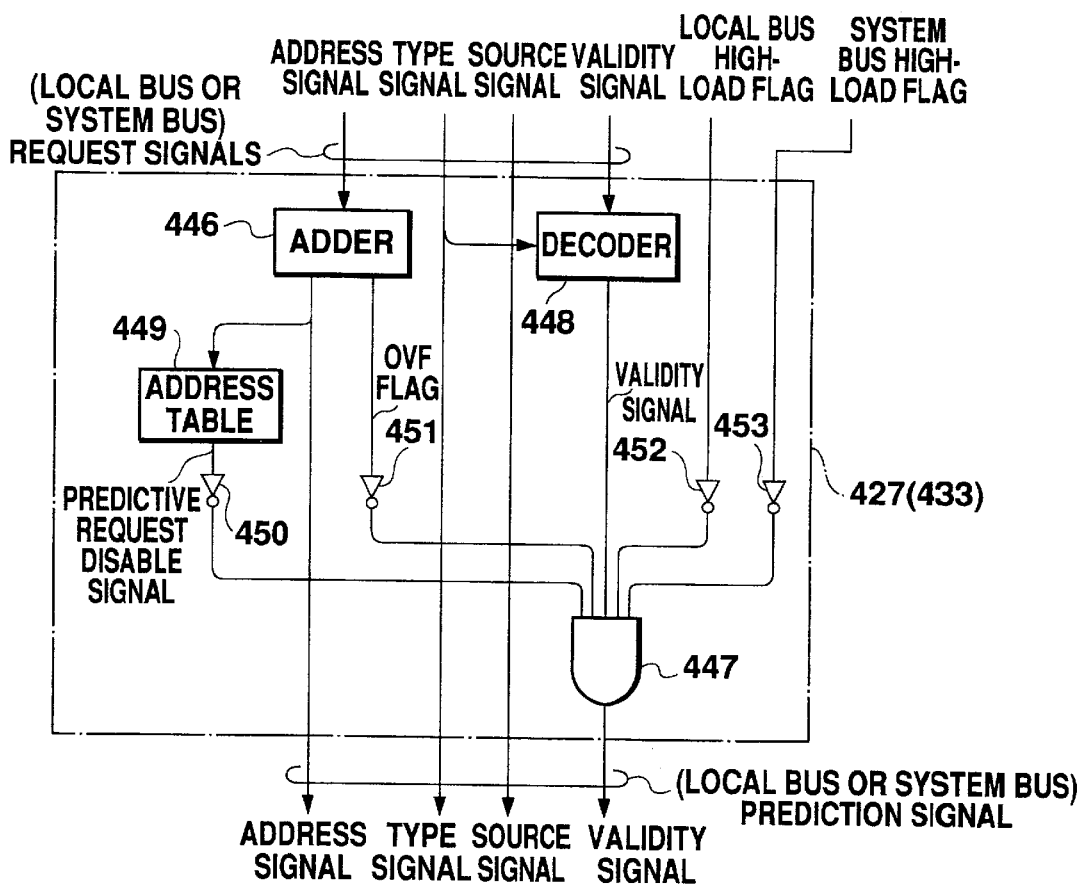
FIG. 8 is a block diagram showing a configuration of a request prediction unit in the first embodiment.

FIG. 8 shows an internal configuration of the request prediction unit 427. Since the internal configuration and operation of the request prediction unit 433 are substantially the same with the internal configuration and operation of the request prediction unit 427, the description of its internal configuration and operation will not be repeated. With regard to the internal configuration and operation of the request prediction unit 433, all instances of "local bus 2" should be read as "system bus 1" and "system bus 1" as "local bus 2" in the description regarding the internal configuration and operation of the request prediction unit 427.

The request prediction unit 427 in this embodiment includes an adder 446 for adding a cache block size to the address signal in the request signal received via the local bus 2. The address signal that is output from the adder 446 after cache block size addition is output together with the type signal and source signal in the received request signal and the validity signal output from an AND gate 447 as a prediction signal. This prediction signal indicates the request signal that is expected to be transmitted in the future onto the local bus 2. Specifically, in this embodiment, it is predicted that if a certain device has issued a request signal at a certain time to read data at a certain address, the address to be read next by that device is an address that consecutively follows the address concerning the issued request signal. According to this embodiment, since the request prediction unit 427 predicts the request signals that are expected to be transmitted in the future onto the local bus 2, and the result of which is supplied as a prediction signal to the tag controller 423 and the like, the data concerning the address that is expected to be requested is cached in advance in the bridge cache 41 so as to yield a system having a high cache hit rate for the bridge cache 41.

However, when the request signals are received via the local bus 2, there are also instances where the prediction signal should not be issued. Therefore, restrictions are imposed on the issuance of prediction signals by the request prediction unit 427. The AND gate 447, a decoder 448, and an address table 449 are provided within the request prediction unit 427 as members related to restricting the issuance of the prediction signals. The adder 446 also includes a function related to restricting the issuance of the prediction signals. Furthermore, as signals related to restricting the issuance of prediction signals, as described above, the high-load flags concerned with the local bus 2 and the system bus 1 are input by the request prediction unit 427. The request prediction unit 427 also includes, in addition to these members, four inverters 450, 451, 452, and 453.

Figure 9:
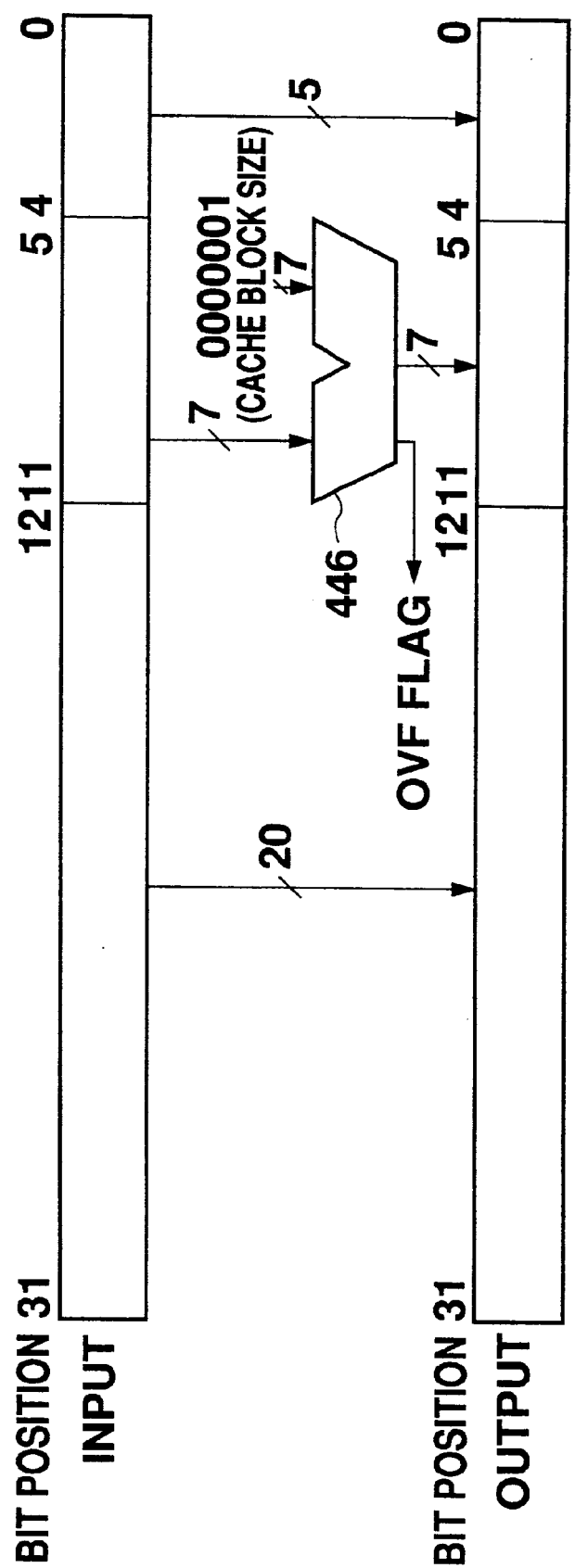
FIG. 9 is a block diagram showing a usage mode of an adder in the first embodiment.

The adder 446 includes functions to detect a page boundary and thus output an OVF flag. FIG. 9 shows the function of the adder 446 having a cache size of 32 bytes and a page size of 4096 bytes (4 KB). In this figure, the adder 446 is a 7-bit adder and generates an address signal (which is the output shown in the figure) forming the prediction signal by adding $2^5$, namely, the cache block size, to the address signal (which is the input shown in the figure) in the received request signal.

Furthermore, if a carry to $2^{12}$ occurs as a result of adding the cache block size to the input shown in the figure, the adder 446 sets the OVF signal, which is a signal indicating overflow. The carry to $2^{12}$ occurs when the input and output shown in the figure belong to different pages, namely, when the page boundary is exceeded by the addition. As shown in FIG. 8, the OVF flag, after being logically inverted by the inverter 451, is input by the AND gate 447 for gating the validity signal. Therefore, when the value of the address signal resulting from the addition of the cache block size by the adder 446 exceeds the page boundary, the output of the AND gate 447 (namely, the validity signal in the prediction signal) turns OFF. The tag controller 423 and the like do not receive prediction signals with the validity signal OFF, namely, invalid prediction signals.

One reason that the issuance of prediction signals concerning the page boundary overflow is inhibited in this manner is because of the low probability of any single device successively accessing two addresses belonging to different pages. Further, if the address resulting from the addition of the cache block size corresponds to a physical address that is not available i.e. not installed, an address-over error occurs. Preventing this address-over error is another reason for inhibiting the issuance of prediction signals concerning the page boundary overflow. Namely, in this embodiment, an increase in load on the system bus 1 and the occurrence of errors due to the issuance of request signals based on the predicted result are prevented by judging page boundary overflow and based on the result thereof restricting the issuance of prediction signals.

Figure 10:
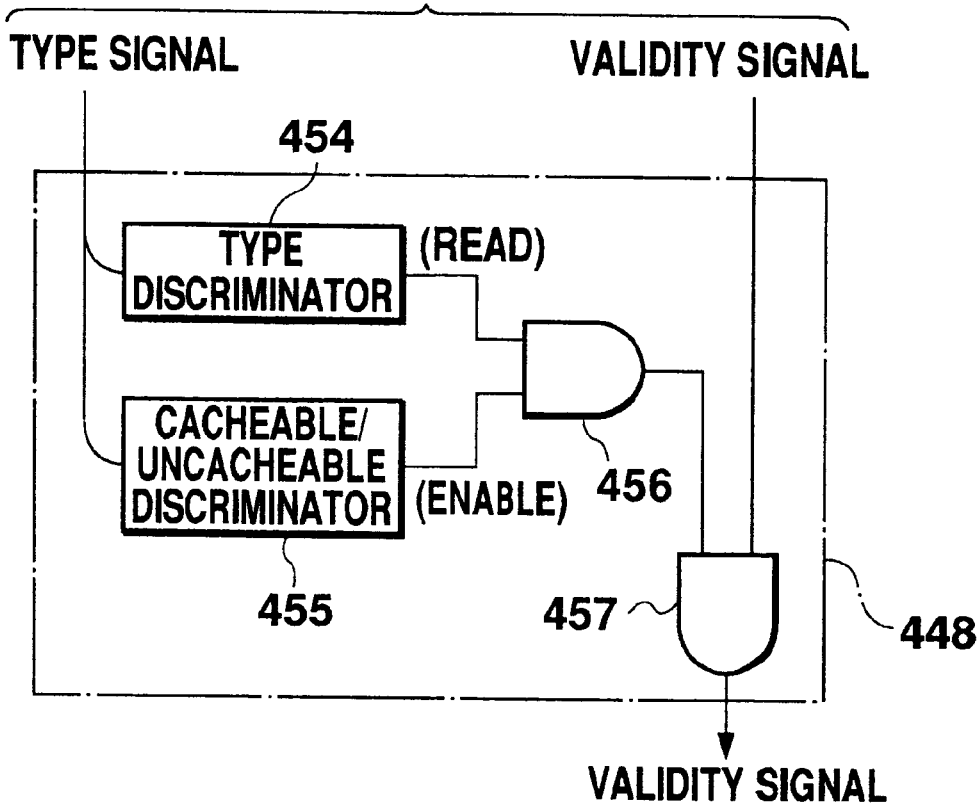
FIG. 10 is a block diagram showing a configuration of a decoder in the first embodiment.

As shown in FIG. 10, the decoder 448 includes a type discriminator 454, a cacheable/uncacheable discriminator 455, and AND gates 456 and 457. The type discriminator 454 and the cacheable/uncacheable discriminator 455 both perform judgments on the basis of the type signal in the request signal received via the local bus 2, and output "1" or "0" in accordance with the judgment results. The outputs of the type discriminator 454 and the cacheable/uncacheable discriminator 455 both are input by the AND gate 456, and the output of the AND gate 456 is input by the AND gate 457. The AND gate 457 gates the validity signal in the received request signal using the output of the AND gate 456. The output of the AND gate 457 is input by the AND gate 447 shown in FIG. 8.

The type discriminator 454 outputs a "1" when the request signal received via the local bus 2 relates to the reading of data, such as memory read, I/O read, and so forth, and outputs a "0" such as when the received request signal relates the cache invalidation. Therefore, even though the request signals received via the local bus 2 are valid request signals, valid prediction signals are not output from the request prediction unit 427 if the request signals concern cache invalidation. In this manner, this embodiment prevents data by required another device from becoming invalidated by a request signal issued on the basis of the predicted result.

The cacheable/uncacheable discriminator 455 judges, on the basis of the flag included in the type signal, whether or not the request signal concerns an address belonging to an uncacheable space. If judgment is positive, a "0" is output, otherwise, a "1" is output. Therefore, when part of the memory space provided by the memory 5 is handled as an uncacheable space that is not for caching, the issuance of a prediction signal regarding an address belonging to this space and the resulting transmission of the request signal onto the system bus 1 can be prevented. As a result, this embodiment prevents an increase in the load on the system bus 1 caused by the issuance of request signals based on predicted results.

The address table 449 shown in FIG. 8 stores register (such as status registers) addresses, the contents of which change by being read, and addresses for which some sort of negative "side effect" occurs from the issuance of request signals based on the predicted result. If the address signal that is output from the adder 446, the address signal for which the cache block size has been added, coincides with any address stored in the address table 449, the address table 449 outputs a prediction request disable signal having a value of "1". This signal is input by the AND gate 447 via the inverter 450. Therefore, according to this embodiment, the issuance of request signals relating to a negative "side effect" can be prevented.

The AND gate 447 shown in FIG. 8 inputs a high-load flag generated from the load monitor 432 via the inverter 453. Therefore, if it is predicted that the load on the system bus 1 will increase and exceed a certain limit when request signals are transmitted onto the system bus 1, the transmission of request signals onto the system bus 1 is inhibited so that the load on the system bus 1 can be suppressed. The AND gate 447 inputs a high-load flag generated from the load monitor 426 via the inverter 452. Therefore, when the load on the local bus 2 rises, the caching of data to the bridge cache 41 on the basis of the predicted result is inhibited. This delays a response with a data signal with respect to a request concerning a read from a device connected to the local bus 2 so as to lighten the load on the local bus 2.

(5) Second Embodiment

In the above-mentioned first embodiment, when a device connected to the local bus 2 has issued a request signal concerning a read, a prediction signal is issued on the basis of the request signal, and another request signal based on this prediction signal is issued and transmitted onto the system bus 1. In contrast, in a second embodiment to be described hereinafter, the request prediction unit 427 issues a prediction signal on the basis of transaction history regarding the issue of request signals from a device connected to the local bus 2. Since the request prediction unit 433 can have the same internal configuration and operation, the description hereinafter will be given for the internal configuration and operation of the request prediction unit 427. As described earlier, the description should be interpreted appropriately for the internal configuration and operation of the request prediction unit 433.

Figure 11:
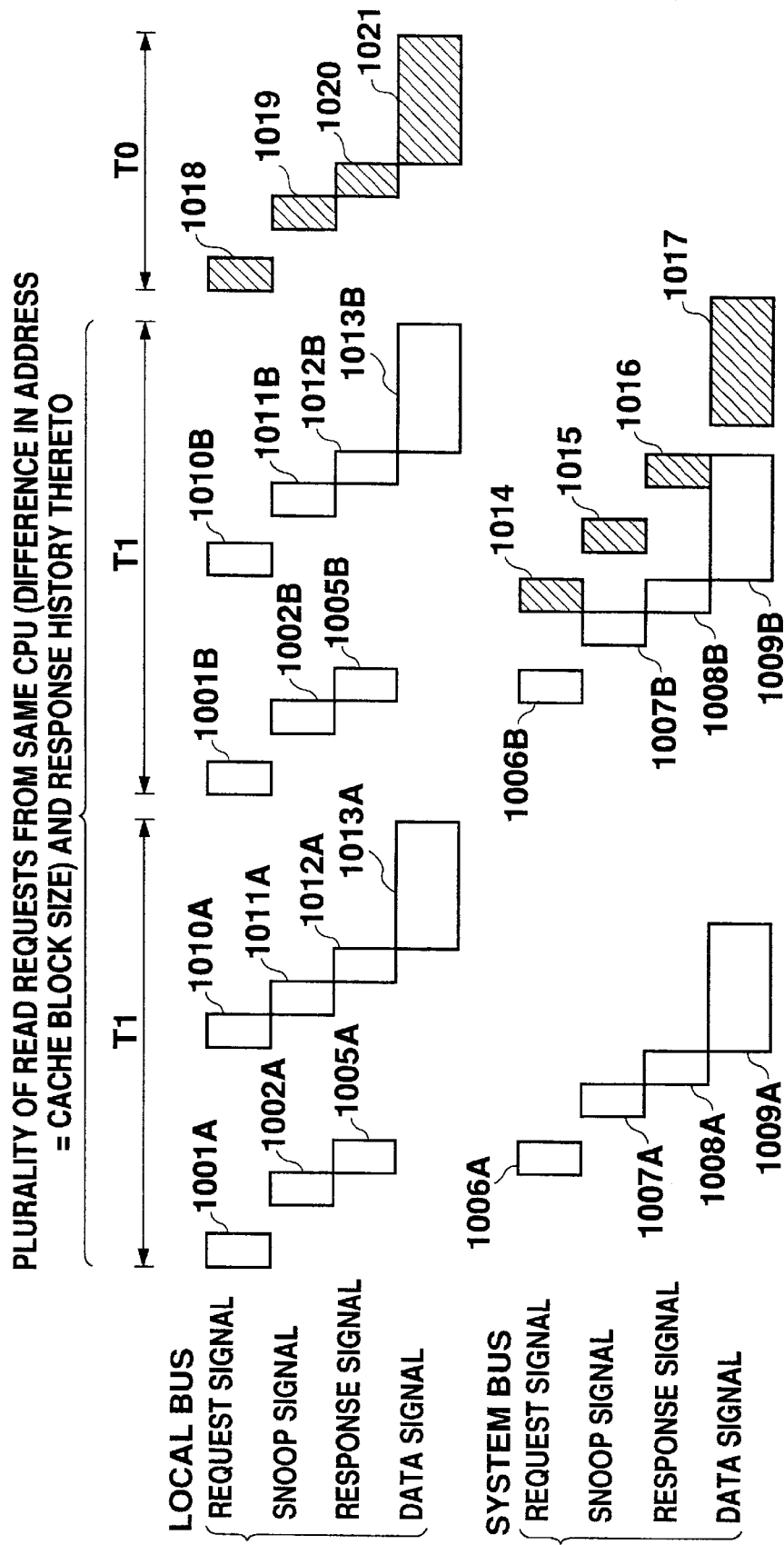
FIG. 11 is a timing chart showing an example of signal transmission states on a local bus and a system bus in a second embodiment of the present invention.

FIG. 11 shows an operation of the bus bridge 4 in this embodiment, particularly an operation when request signals concerning a read are issued by a device connected to the local bus 2. In the figure, steps 1001A to 1013A and steps 1001B to 1013B respectively correspond to the same process in steps 1001 to 1013 shown in FIG. 5. The device issuing the request signal in step 1001A and the device issuing the request signal in 1001B are assumed here to be the same device, and the address requested in step 1001A and the address requested in step 1001B are assumed to be consecutive addresses. Between steps 1001A to 1013A and steps 1001B to 1013B, transmissions may be performed by any device, including the device issuing the request signals concerning these steps. In this embodiment, when the same device transmits a plurality of request signals (two in the figure) concerning consecutive addresses onto the local bus 2, the request prediction unit 427 performs prediction, and the process concerning steps 1014 to 1021 may be executed. Processes characteristic of the present invention, such as prediction, are not executed at the stage where only the steps 1001A to 1013A are finished. According to this embodiment, the accuracy of prediction improves as compared to the first embodiment and the load on the system bus 1 is reduced, since prediction is performed on the basis of request signal transaction history on the local bus 2 in this manner and the process to issue request signals onto the system bus 1 is performed on the basis of the predicted result.

Figure 12:
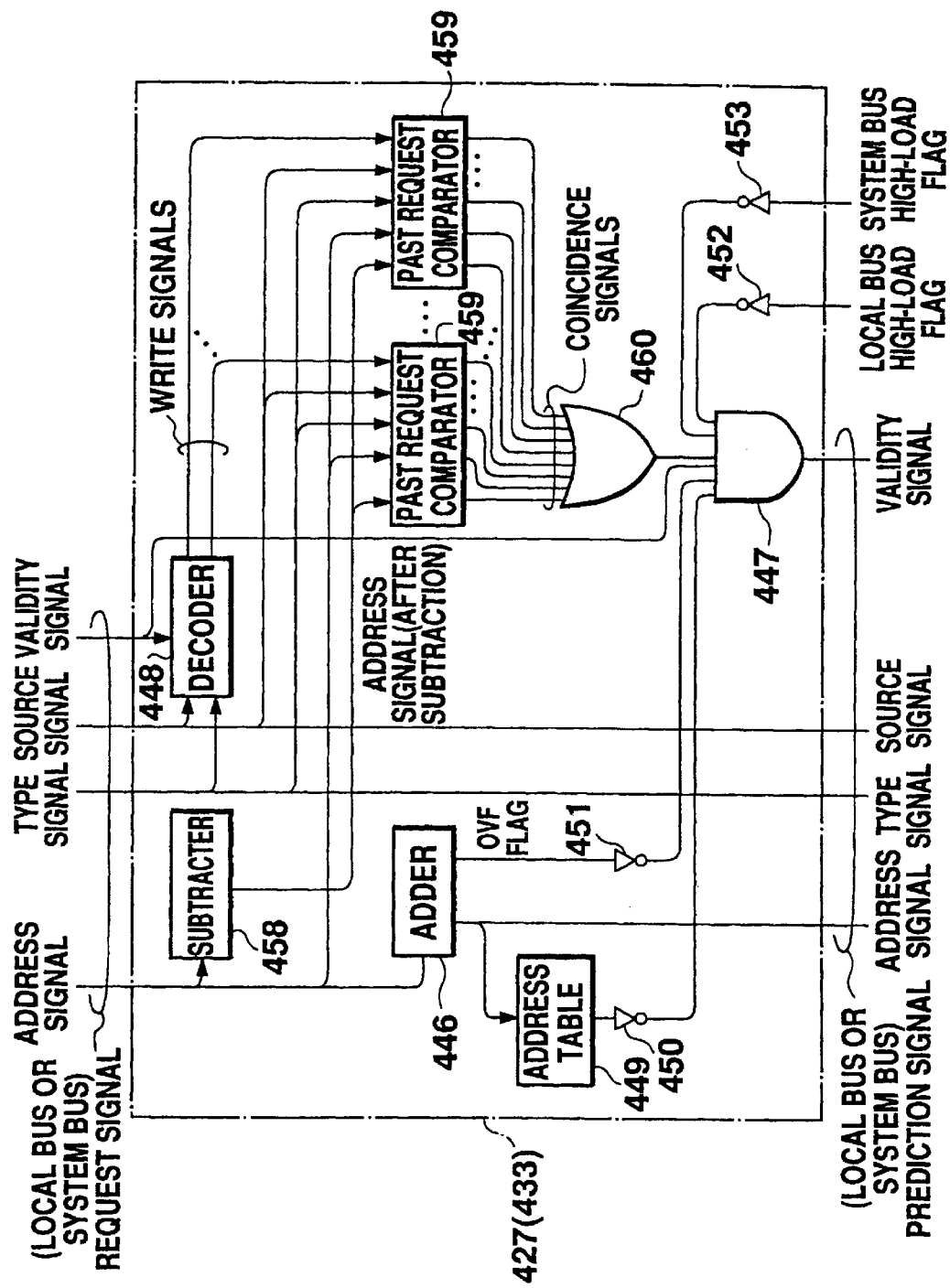
FIG. 12 is a block diagram showing a configuration of a request prediction unit in the second embodiment.

FIG. 12 shows a possible configuration of the request prediction unit 427 in this embodiment. In this embodiment, a subtracter 458, a past request comparator 459, and an OR gate 460 are newly provided. The subtracter 458 subtracts the cache block size from the address signal in the request signal received via the local bus 2, and supplies the result, which is an address signal obtained after subtraction, to the past request comparator 459. The past request comparator 459 judges whether or not a request signal concerning the address signal after subtraction has been issued in a past period by the device originating the request signal received via the local bus 2. If such a signal was issued, the past request comparator 459 outputs a coincidence signal to permit the issue of a prediction signal. The OR gate 460 inputs the coincidence signal that is output from each past request comparator 459, and supplies a "1" to the AND gate 447, when a coincidence signal is obtained from one of a plurality of past request comparators 459 that are provided. This configuration enables the issue of prediction signals based on the request signal transaction history of the past.

The past request comparators 459 are provided to correspond with each device connected to the local bus 2 of the connected destination. Namely, a past request comparator 459 is provided for each device connected to the local bus 2 so that the first past request comparator 459 corresponds to the first CPU 3, the second past request comparator 459 corresponds to the second CPU 3, and so forth. Each past request comparator 459 stores the transaction history of request signals issued to the local bus 2 by the corresponding device. In this embodiment, a past request comparator 459 is provided for each device to achieve both advantages (to be described hereinafter) of high prediction accuracy and small scale (low cost) hardware. Each past request comparator 459 also inputs the type signal and source signal in the received request signal so as to perform comparative judgments concerning the request signal transaction history. The address signals in the received request signals are input by the past request comparators 459 so as to store the transaction history of the request signals. Furthermore, the decoder 448 issues a write signal concerning one of the past request comparators 459 selected on the basis of the source signal in the received request signal.

Figure 13:
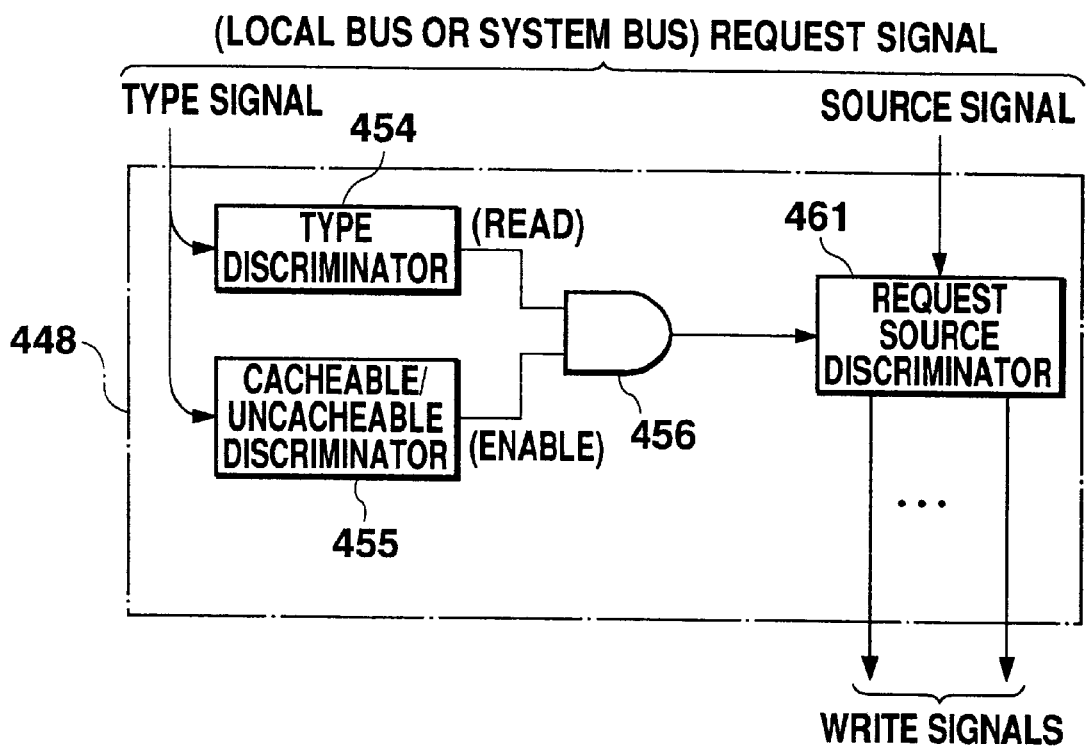
FIG. 13 is a block diagram showing a configuration of a decoder in the second embodiment.

FIG. 13 shows a configuration of the decoder 448 in this embodiment. In the above-mentioned first embodiment, the type signal in the received request signal was interpreted, and based on this result, the validity signal was gated. In contrast, in this embodiment, based on the results of interpreting the type signal in the received request signal and of interpreting the source signal in the received request signal, one of a plurality of past request comparators 459 is selectively write enabled. It should be noted that, as shown in FIG. 12, in this embodiment the validity signal in the received request signal is input by the AND gate 447.

More specifically, in this embodiment, a source discriminator 461 is provided in place of the AND gate 457 in the first embodiment. The source discriminator 461 selects, on the basis of the source signal in the received request signal, one of a plurality of past request comparators 459 that corresponds to the origin of the request signal. The source discriminator 461 issues a write signal concerning the selected past request comparator 459 so that the received request signals mentioned above are written (queued) to the request queue (to be described hereinafter) within the past request comparator 459.

Figure 14:
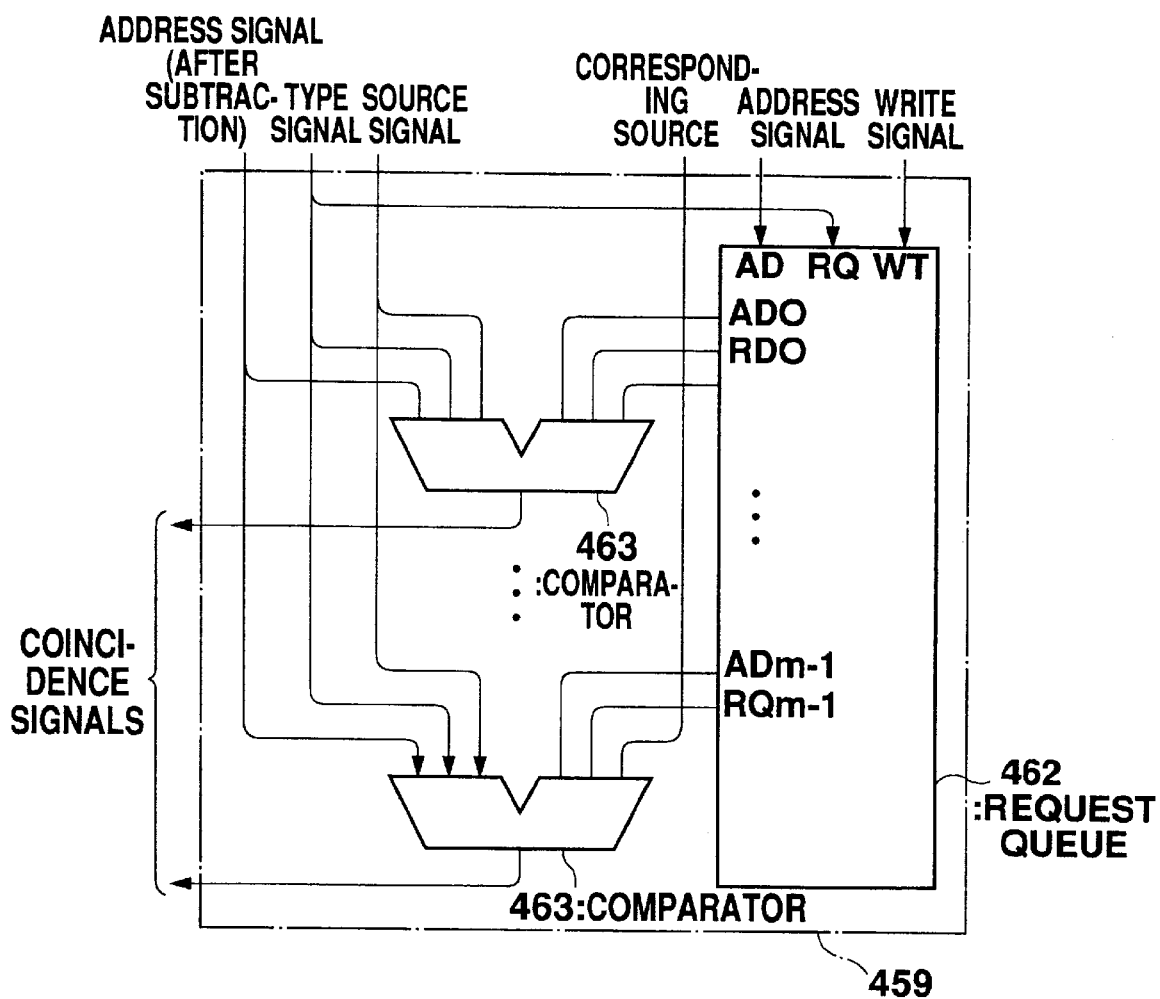
FIG. 14 is a block diagram showing a configuration of a past request comparator in the second embodiment.

FIG. 14 shows a configuration of the past request comparator 459. The past request comparator 459 includes a request queue 462 and a plurality of comparators 463. The request queue 462 is provided with input terminals AD, RQ, and WT. To input terminal AD is supplied an address signal that is included in the request signal issued by a device corresponding to the past request comparator 463 and received via the local bus 2. To input terminal RQ is supplied a type signal that is included in the request signal issued by a device corresponding to the past request comparator 463 and received via the local bus 2. To input terminal WT is supplied a write signal issued by the decoder 448. In other words, when a request signal issued by a certain device is received by the bus bridge 4 via the local bus 2, the decoder 448 activates one corresponding write signal according to the source signal in the request signal. As a result, the address signal and type signal in the above-mentioned received request signals are queued into the request queue 462 of the corresponding past request comparator 459 to which the activated write signal is being supplied.

To the request queue 462 are further provided m sets of output terminals, $AD_0$ and $RQ_0$, $AD_1$ and $RQ_1$, ... $AD_{m-1}$ and $RQ_{m-1}$, where m is a natural number greater than or equal to 2 indicating the depth of the request queue 462. $AD_0$ and $RQ_0$, $AD_1$ and $RQ_1$, ... $AD_{m-1}$ and $RQ_{m-1}$ are terminals for supplying corresponding set of address signals and type signals found in the request queue 462 to the respective comparators 463, and thus there are m number of comparators 463 provided to correspond to the output terminals of the request queue 462. Each comparator 463 has two sets of terminals for inputting address signals, type signals, and source signals. To one set of terminals are supplied the address signal that is output from the subtracter 458 and the type signal and source signal in the received request signal. To the other set of terminals are supplied the address signal and type signal that are supplied from the corresponding output terminals of the request queue 462 and a number unique to, and utilized as the source number by, the device corresponding to the past request comparator 459. Each comparator 463 outputs a coincidence signal when these two sets of inputs coincide with each other.

Such a configuration enables the request signals issued by the corresponding device, after being sequentially stored, to be detected as request transaction history. Furthermore, since the type of request signal is determined by the decoder 448 so that the request signals to be queued are reduced as much as possible, accurate prediction is possible even with a shallow depth (that is, small m) for the request queue 462. Therefore, besides limiting the size of the request queue 462, the number of comparators 463 is reduced to thereby lower costs.

A past request comparator 459 need not be provided for each device. However, if the past request comparator 459, particularly the request queue 462, is not divided among the devices, the request signals from devices that issue request signals at a relatively low frequency will be displaced in the request queue 462 by the request signals from devices that issue request signals at a relatively high frequency. If such a situation occurs, the characteristic advantage of the present invention with regard to devices that issue request signals at a relatively low frequency, namely, the improvement of the cache hit rate for the bridge cache 41, is less likely to appear. According to this embodiment, dividing the request queue 462 among the devices enhances the improvement in the cache hit rate for the bridge cache 41. An added result is that the scale of the necessary hardware is relatively small.

The second embodiment of the present invention enables the device to not issue request signals based on the predicted result, provided at least two request signals are not received from the same device via the local bus 2. Taking this concept further, the present invention can also be configured so as to not issue request signals based on the predicted result, provided n-number of request signals (where n is a natural number greater than or equal to 3) are not received from the same device via the local bus 2.

(6) Third Embodiment

As described above, prediction is performed in the first embodiment on the basis of one received request signal, and prediction is performed in the second embodiment on the basis of the received request signals which provide the transaction history heretofore regarding the request signals. Therefore, in terms of prediction accuracy, the second embodiment is superior to the first embodiment. Namely, in terms of the extent of increase in the load on the system bus 1 because of the superfluous request signals issued on the basis of the predicted result (resulting in data not actually requested), the second embodiment is advantageous over the first embodiment. On the other hand, in terms of improving the cache hit rate for the bridge cache 41, the cache hit rate in the second embodiment is lower than that in the first embodiment, because the frequency of issuing request signals on the basis of the predicted result is lower.

There is therefore a trade-off between the first and second embodiments. The third embodiment of the present invention has an object to concurrently embody the advantages of the first embodiment and of the second embodiment. More specifically, the load monitors 426 and 432 are provided with a plurality of criteria so that several types of high-load flags can be generated in each of the load monitors 426 and 432. Simultaneously, the request prediction units 427 and 433 are provided with a function equivalent to that in the first embodiment and a function equivalent to that in the second embodiment so that one of either function is selectively used according to which one of the above-mentioned high-load flags is set or to the combination of set high-load flags. For simplicity, the description hereinafter will be given in abbreviated form similar to the descriptions for the preceding embodiments. Furthermore, an example will be described where the load monitors 426 and 432 each generates two types of high-load flags. However, in this embodiment, the configuration may be modified so that more types of flags are generated.

Figure 15:
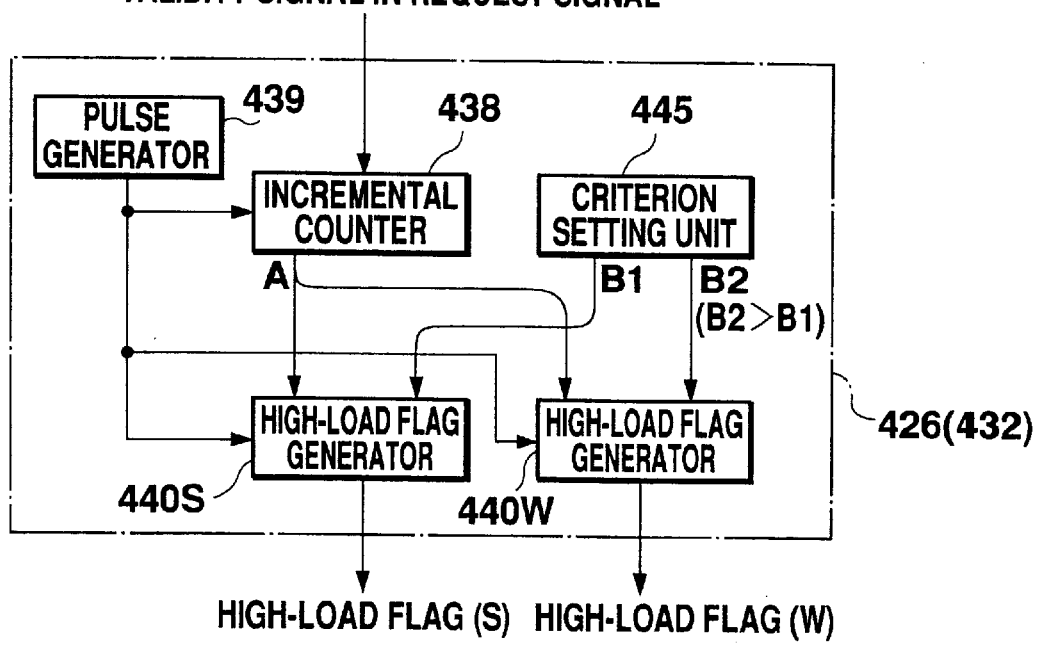
FIG. 15 is a block diagram showing a configuration of a load monitor in a third embodiment of the present invention.

FIG. 15 shows an internal configuration of the load monitor 426 in this embodiment. To the incremental counter 438 in this embodiment, two high-load flag generators 440S and 440W are connected in parallel. The internal configuration and operation of these high-load flag generators 440S and 440W are identical to the high-load flag generator 440 that has been already described. Furthermore, the criterion setting unit 445 furnishes criteria to the high-load flag generators 440S and 440W. The criterion furnished to the high-load flag generator 440S (B1 in the figure) and the criterion furnished to the high-load flag generator 440W (B2 in the figure) may be the same value but are preferably different values. In the example in the figure, B2>B1.

In a case where each criterion is set according to this example, if A<B1 at the leading edge of a pulse (refer to FIG. 7), the outputs of both high-load flag generators 440S and 440W are "0", if B1≦A≦B2, the output of the high-load flag generator 440S is "1" and the output of the high-load flag generator 440W is "0", and if B2≦A, the output of both high-load flag generators 440S and 440W is "1". Therefore, the output of the high-load flag generator 440S reacts more sensitively to increases in load than the output of the high-load flag comparator 440W. In the description hereinafter, the former is referred to as a high-load flag (S) i.e. "strong" while the latter is referred to as a high-load flag (W) i.e. "weak".

Figure 16:
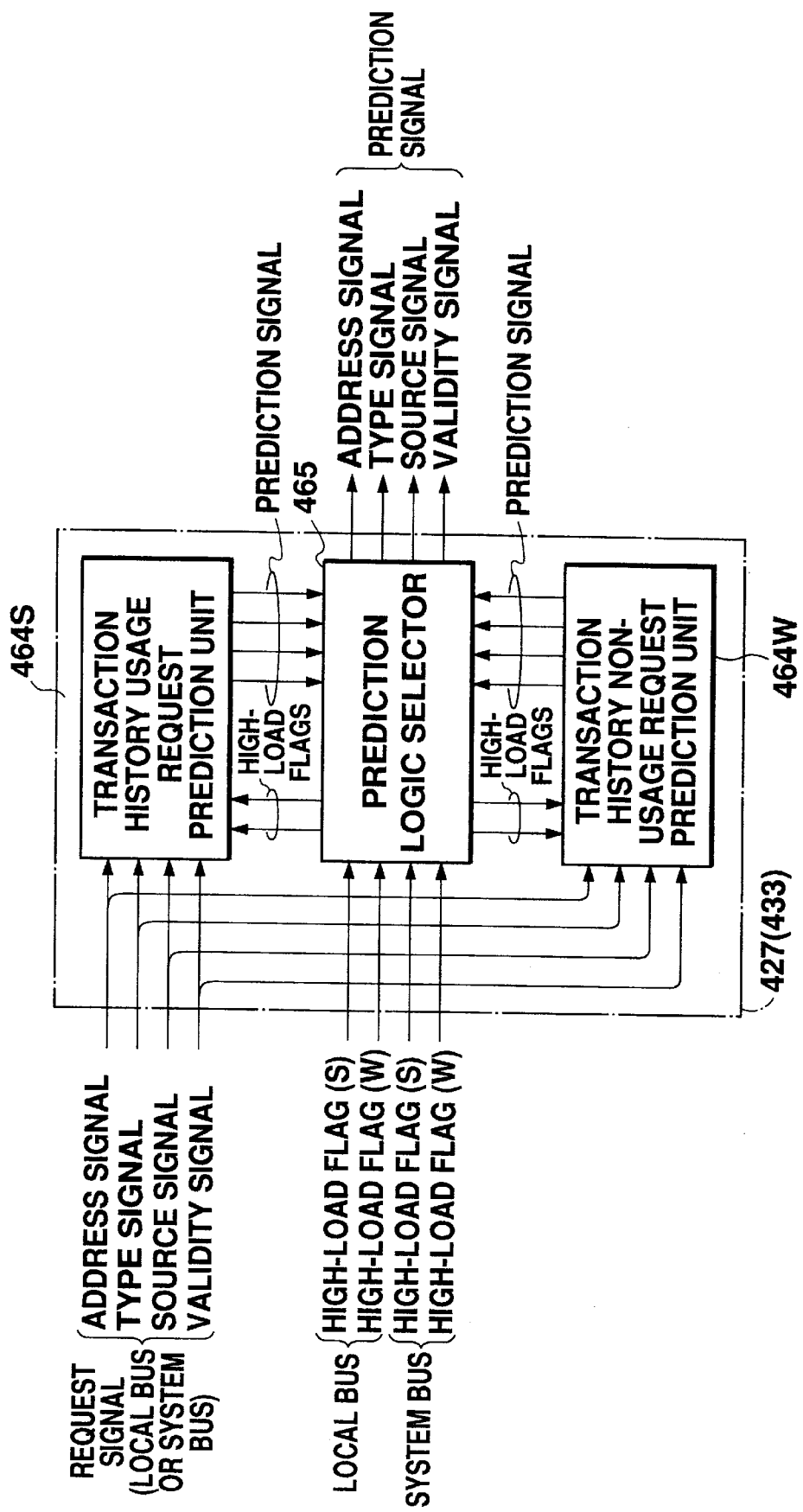
FIG. 16 is a block diagram showing a configuration of a request prediction unit in the third embodiment.

FIG. 16 shows an internal configuration of the request prediction unit 427 in this embodiment. In this embodiment, the request prediction unit 427 is provided with a transaction history usage request prediction unit 464S, a transaction history non-usage request prediction unit 464W, and a prediction logic selector 465. The transaction history usage request prediction unit 464S has the same internal configuration as the request prediction unit 427 (refer to FIG. 12) in the second embodiment, and the transaction history non-usage request prediction unit 464W has the same internal configuration as the request prediction unit 427 (refer to FIG. 8) in the first embodiment. The prediction logic selector 465 actuates the transaction history usage request prediction unit 464S or the transaction history non-usage request prediction unit 464W according to the logic shown in the following table.

TABLE 1

| HIGH-LOAD FLAG (S) | HIGH-LOAD FLAG (W) | PREDICTION METHOD |
|---|---|---|
| 0 | 0 | NON-USAGE OF TRANSACTION HISTORY |
| 1 | 0 | USAGE OF TRANSACTION HISTORY |
| 1 | 1 | NO PREDICTION PERFORMED |

Namely, the prediction logic selector 465 selects either the prediction signal issued by the transaction history usage request prediction unit 464S or the prediction signal issued by the transaction history non-usage request prediction unit 464W according to whether or not the high-load flag (S) and the high-load flag (W) of the local bus 2 and the system bus 1 are set (value is "1"), and outputs the selected prediction signal to the other members.

First, if both the high-load flag (S) and the high-load flag (W) are "0", the prediction logic selector 465 selects the prediction signal issued by the transaction history non-usage request prediction unit 464W so as to further enhance the improvement in the cache hit rate for the bridge cache 41 by the issue of request signals based on the predicted result. If the high-load flag (S) is "1" and the high-load flag (W) is "0" for at least either the local bus 2 or the system bus 1, the prediction signal issued by the transaction history usage request prediction unit 464S is selected so as to reduce the bus load while only slightly sacrificing the improvement in the cache hit rate for the bridge cache 41 by the issue of request signals based on the predicted result. If both the high-load flag (S) and the high-load flag (W) are "1" for either or both the local bus 2 and the system bus 1, both the prediction signal issued by the transaction history usage request prediction unit 464S and the prediction signal issued by the transaction history non-usage request prediction unit 464W are not selected.

In FIG. 16, two types of high-load flags (high-load flag concerning local bus 2 and high-load flag concerning system bus 1) are supplied from the prediction logic selector 465 to the transaction history usage request prediction unit 464S and the transaction history non-usage request prediction unit 464W. This corresponds to the configurations given in FIGS. 8 and 12. The prediction logic selector 465 supplies a signal having values of "0" as a high-load flags to the currently selected transaction history usage request prediction unit 464S or transaction history non-usage request prediction unit 464W.

In this manner, the transaction history non-usage request prediction unit 464W, which greatly improves the cache hit rate while at the same time raises the probability of an increase in bus load, and the transaction history usage request prediction unit 464S, which lowers the probability of a bus load increase due to the issuing of useless request signals while at the same time slightly lowers the improvement in cache hit rate, are selectively used in this embodiment to create greater flexibility than in the first and second embodiments, and to achieve an improvement in system performance. Note that although FIG. 16 depicts the transaction history usage request prediction unit 464S and the transaction history non-usage request prediction unit 464W as separate blocks, part of their internal configurations (such as adder 446) may be shared in actual implementation.

(7) Supplement

In the preceding description, a plurality of local buses 2 were used and a plurality of CPUs 3 were connected to each local bus 2. However, in embodying the present invention, one local bus 2 may be used and one CPU 3 may be connected to the local bus 2. Furthermore, whereas CPUs 3 and bus bridges 4 were given as examples of devices connected to the local bus 2, other types of devices may be connected, such as memories and I/O bridges. Furthermore, a plurality of bus bridges 4 may be connected to one local bus 2. Namely, whereas a two layer system shown in FIG. 1 was given as an example in the preceding description, a three (or more) layer system may be used. In such a system, a bus bridge for bridging between a bus belonging to a certain layer and a bus belonging to another layer separated from the former layer by one or more layers may be provided. Furthermore, a device, such as a CPU, may be connected to the system bus 1. For variations in system configuration, reference to Japanese Patent Laid-Open Publication No. Hei 9-128346, which constitutes a part of this application, is suggested.

Furthermore, in the preceding description, the signal interface concerning the local bus 2 and the system bus 1 used examples comprising request signals, snoop signals, response signals, and data signals. However, the present invention is also applicable to systems employing a different type of signal configuration for each bus, in other words, to systems employing processes for signal transmission in each bus unlike those described in the preceding. Namely, the present invention is applicable to any system in which it is necessary to place a device (not limited to a CPU) that requested data into a temporary standby state until the requested data is obtained from a device, such as memory.

Furthermore, in the preceding description, the high-load flag generated by the load monitor 426 and the high-load flag generated by the load monitor 432 were both input by the request prediction unit 427. However, when embodying the present invention, the high-load flag generated by the load monitor 432 alone may be input by the request prediction unit 427. In this instance also, the cache hit rate for the bridge cache 41 can be raised without appreciably increasing the load on the system bus 1. Generally speaking, in a configuration where the function for predicting the issuance of request signals is provided for one bus and the function for monitoring the load on the bus is provided for another bus, a response can be made quickly using data with respect to a request via one bus without appreciably increasing the load on the other bus. Furthermore, for a system in which bus load is not a significant problem, the function for monitoring the bus load may be omitted.

While there have been described what are at present considered to be preferred embodiments of the invention, it will be understood that various modifications may be made thereto, and it is intended that the appended claims cover all such modifications as fall within the true spirit and scope of the invention.

What is claimed is:

1. A bridge method comprising:
    predictively caching into a bridge cache located within a bus bridge bridging between first and second buses, a portion of data in a device connected to the second bus, by issuing an anticipatory request signal requesting that data, based on a prediction concerning contents of a request signal which may be issued in the future by one of a plurality of devices connected to the first bus, and transmitting the anticipatory request from the bus bridge to the second bus; and
    before transmitting to the first bus the data cached in the bridge cache in response to the anticipatory request signal when a request signal is actually issued by one of the devices connected to the first bus and requesting the data cached, transmitting a response request to the devices connected to the first bus to confirm that the data requested is not found in any device connected to the first bus, and, if confirmed, transmitting the requested data to the device connected to the first bus that has requested the requested data.

2. The bridge method according to claim 1 comprising inhibiting issuance of the anticipatory request signal in predictively caching when a high-load condition occurs on one of the first and second buses.

3. A bus bridge comprising:

a bridge cache, which is cache memory, located within said bus bridge and caching data held by devices connected to one of a first bus and a second bus, the bus bridge connecting the first and second buses;

a request prediction unit predicting contents of a request signal that may be issued in the future by a device connected to the first bus, and issuing a prediction signal that indicates contents of the request signal that may be issued in the future;

a cache hit judgment unit for determining, when a request signal is actually issued from a device connected to the first bus or when the prediction signal is issued from said request prediction unit, whether the data requested by the request signal or the prediction signal and not found in any device connected to the first bus is found in said bridge cache;

a response generator for issuing, when it is determined that the data requested by the request signal actually issued from a device connected to the first bus is not found in said bridge cache, a response signal to the device that issued the request signal to instruct the device to wait for a subsequent transmission of that data; and a request issuer for issuing, when it is determined that data requested by the request signal actually issued from the device connected to the first bus or by the prediction signal issued from said request prediction unit is not found in said bridge cache, a request signal, for requesting the data, to a device connected to the second bus, wherein when the data requested is found in a device connected to the second bus, said bus bridge sends a response request to the devices connected to the first bus, requesting a confirmation that the data requested is not found in any device connected to the first bus, and, if the confirmation is received, transmits the requested data to the device connected to the first bus that has requested the requested data.

4. The bus bridge according to claim 3 wherein said request prediction unit includes an adder for adding a cache block size to a value of an address signal included in a request signal actually issued from a device connected to the first bus, to determine the value of a n address signal to be included in the prediction signal.

5. The bus bridge according to claim 4 wherein said adder sets an overflow (OVF) flag to indicate an overflow when, as a result of adding the cache block size, a carry occurs to a position exceeding a page size, and said request prediction unit further comprises a gate inhibiting issuance of the prediction signal when the OVF flag has been set, and the issuance of the prediction signal is inhibited when the address signal obtained from said adder and the address signal in the request signal actually issued point to addresses of different pages.

6. The bus bridge according to claim 4 wherein said request prediction unit comprises:

an address table issuing a predictive request disable signal when a value of the address signal obtained from said adder points to an address in the address table; and a gate inhibiting issuance of the prediction signal in response to the predictive request disable signal.

7. The bus bridge according to claim 4 wherein said request prediction unit comprises:

a cacheable/uncacheable discriminator determining whether a type signal included in the request signal actually issued from the device connected to the first bus includes a flag indicating an uncacheable space; and a gate inhibiting issuance of the prediction signal when the flag is included.

8. The bus bridge according to claim 4 wherein said request prediction unit comprises:

a type discriminator determining whether a type signal included in the request signal actually issued from the device connected to the first bus indicates a data read; and a gate inhibiting issuance of the prediction signal when it is determined that a data read is not indicated in the request signal.

9. The bus bridge according to claim 4 comprising a load monitor monitoring a load on the second bus, and, as a result, setting a high-load flag when the load is greater than a criterion, and wherein said request prediction unit comprises a gate inhibiting issuance of the prediction signal when the high-load flag has been set.

10. The bus bridge according to claim 9 wherein said load monitor comprises:

an incremental counter determining and outputting a count of occurrences of validity signals included in request signals on the second bus;

a comparator comparing the count with the criterion; and a selector setting the high-load flag at least within a first time period after a comparison by said comparator establishes that the count is greater than the criterion.

11. The bus bridge according to claim 9 wherein said load monitor comprises a criterion setting unit for varying the criterion.

12. The bus bridge according to claim 4 comprising a load monitor monitoring a load on the first bus, and, as a result, setting a high-load flag when the load is greater than a criterion, and wherein said request prediction unit comprises a gate inhibiting issuance of the prediction signal when the high-load flag has been set.

13. The bus bridge according to claim 12 wherein said load monitor comprises:

an incremental counter determining and outputting a count of occurrences of validity signals included in request signals on the first bus;

a comparator comparing the count with the criterion; and a selector setting the high-load flag at least within a first time period after a comparison by said comparator establishes that the count is greater than the criterion.

14. The bus bridge according to claim 12 wherein said load monitor comprises a criterion setting unit for varying the criterion.

15. The bus bridge according to claim 4 wherein said request prediction unit comprises:

a request queue in which request signals actually issued from devices connected to the first bus are queued;

a subtracter estimating a request signal issued in the past, by subtracting the cache block size from an address signal in a request signal each time the request signal is issued from any one of the devices connected to the first bus;

a comparator comparing a request signal estimated with a request signal queued; and a gate permitting issuance of the prediction signal when a comparison by said comparator detects a match and inhibiting issuance of the prediction signal when the comparison does not detect a match.

16. The bus bridge according to claim 15 wherein said request prediction unit comprises:

a plurality of said request queues respectively corresponding to each device connected to the first bus; and a request source discriminator determining a device originating a request signal based on a source signal included in the request signal, and queuing the request signal in a corresponding request queue.

17. The bus bridge according to claim 15 wherein said request prediction unit includes a request source discriminator excluding, from queuing in a request queue, request signals with a type signal that is not a data read.

18. The bus bridge according to claim 3 wherein said request prediction unit comprises:

a transaction history usage request prediction unit predicting contents of a request signal that may be issued in the future from the device connected to the first bus, based on contents of a plurality of request signals previously issued from the device;

a transaction history non-usage prediction unit predicting contents of a request signal that may be issued in the future from the device connected to the first bus, based on contents of one request signal recently issued from the device; and a prediction logic selector selecting a result predicted by either said transaction history usage request prediction unit or said transaction history non-usage request prediction unit, and issuing the prediction signal based on a selected result predicted.

19. The bus bridge according to claim 18 wherein said prediction logic selector selects a result predicted by said transaction history non-usage request prediction unit when a load on the second bus is lower than a first criterion, selects a result predicted by said transaction history usage request prediction unit when the load on the second bus is higher than the first criterion and lower than a second criterion, and inhibits issuance of the prediction signals when the load on the second bus is higher than the second criterion.

20. The bus bridge according to claim 19 comprising a load monitor comparing the load on the second bus with the first criterion and the second criterion, and informing said prediction logic selector of results of the comparing.

21. The bus bridge according to claim 19 wherein said prediction logic selector selects a result predicted by said transaction history non-usage request prediction unit when a load on the first bus is lower than a first criterion, selects a result predicted by said transaction history usage request prediction unit when the load on the first bus is higher than the first criterion and lower than a second criterion, and inhibits issuance of the prediction signals when the load on the first bus is higher than the second criterion.

22. The bus bridge according to claim 21 comprising a load monitor comparing the load on the first bus with the first criterion and the second criterion, and informing said prediction logic selector of results of the comparing.

23. A multiprocessor system comprising:

a plurality of buses, each bus respectively connected with at least one device; and at least one bus bridge connecting one of said buses to another of said buses, wherein a plurality of processors are connected to a first bus among said plurality of buses, and a memory is connected to a second bus among said plurality of buses that is connected to said first bus via said bus bridge, wherein said bus bridge comprises:

a bridge cache, which is a cache memory, located within said bus bridge and caching data held in said memory a request prediction unit for predicting contents of a request signal that may be issued in the future by one of said processors and issuing a prediction signal that indicates contents of the request signal;

a cache hit judgment unit for determining, when a request signal is actually issued from said processor or when the prediction signal is issued from said request prediction unit, whether the data requested by the request signal or the prediction signal and not found in any processor connected to said first bus is found in said bridge cache;

a response generator for issuing, when it is determined that the data requested by a request signal actually issued from said processor is not found in said bridge cache, a response signal to said processor that issued the request signal to instruct said processor to wait for a subsequent transmission of that data; and a request issuer for issuing, when it is determined that data requested by the request signal actually issued from said processor or by the prediction signal issued from said request prediction unit is not found in said bridge cache, a request signal, for requesting the data, to said memory, wherein when the data requested is found in said memory, said bus bridge sends a response request to said processor requesting a confirmation that the data requested is not found in any of the processors connected to said first bus, and, if the confirmation is received, transmits the requested data to said processor.

* * * * *